(12) United States Patent  (10) Patent No.: US 9,372,337 B2
Arakawa  (45) Date of Patent: Jun. 21, 2016

(54) WAVELENGTH VARIABLE INTERFERENCE FILTER, MANUFACTURING METHOD OF WAVELENGTH VARIABLE INTERFERENCE FILTER, OPTICAL FILTER DEVICE, OPTICAL MODULE, AND ELECTRONIC APPARATUS

(71) Applicant: Seiko Epson Corporation, Tokyo (JP)

(72) Inventor: Katsuji Arakawa, Chino (JP)

(73) Assignee: Seiko Epson Corporation (JP)

( * ) Notice: Subject to any disclaimer, the term of this patent is extended or adjusted under 35 U.S.C. 154(b) by 177 days.

(21) Appl. No.: 14/132,523

(22) Filed: Dec. 18, 2013

(65) Prior Publication Data

US 2014/0168775 A1  Jun. 19, 2014

(30) Foreign Application Priority Data

Dec. 19, 2012  (JP) ................... 2012-276552

(51) Int. Cl.
G02B 27/00 (2006.01)
G02B 1/10 (2015.01)
G02B 5/28 (2006.01)
G02B 26/00 (2006.01)

(52) U.S. Cl.
CPC ............ *G02B 26/001* (2013.01); *G02B 5/28* (2013.01)

(58) Field of Classification Search
CPC .................... G02B 26/001; G02B 5/28–5/289
USPC .................. 359/578, 579, 584, 589
See application file for complete search history.

(56) References Cited

U.S. PATENT DOCUMENTS

| 2004/0233553 | A1 | 11/2004 | Shibata et al. |
| 2005/0122191 | A1 | 6/2005 | Nakamura et al. |
| 2009/0207417 | A1* | 8/2009 | Gibler .................... G02B 6/322 356/480 |
| 2011/0228396 | A1* | 9/2011 | Shinto .................... G02B 5/284 359/578 |
| 2012/0086945 | A1* | 4/2012 | Hirokubo ................. G01J 3/26 356/450 |
| 2012/0257280 | A1* | 10/2012 | Sano ........................ G01J 3/26 359/578 |
| 2013/0083400 | A1* | 4/2013 | Nishimura ............... G01J 3/26 359/578 |

FOREIGN PATENT DOCUMENTS

| JP | 2004-347753 A | 12/2004 |
| JP | 2005-165067 A | 6/2005 |
| JP | 2008-236556 A | 10/2008 |
| JP | 2011-197386 A | 10/2011 |

* cited by examiner

Primary Examiner — Thomas K Pham
Assistant Examiner — Nicholas R Pasko
(74) Attorney, Agent, or Firm — Harness, Dickey & Pierce, P.L.C.

(57) ABSTRACT

A movable substrate of a wavelength variable interference filter includes a movable portion and a groove which is provided outside of the movable portion, in a plan view when the movable substrate is seen from a substrate thickness direction, the groove includes a bottom surface having an even groove depth dimension and a side surface which is continued to the bottom surface, and the side surface is configured with arc-like first curved surface portion and second curved surface portion, in a cross-sectional view when the movable substrate is cut along the substrate thickness direction.

5 Claims, 15 Drawing Sheets

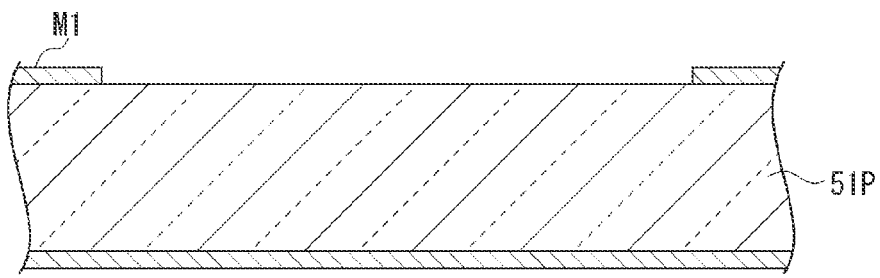
FIG.6A
FIG.6B
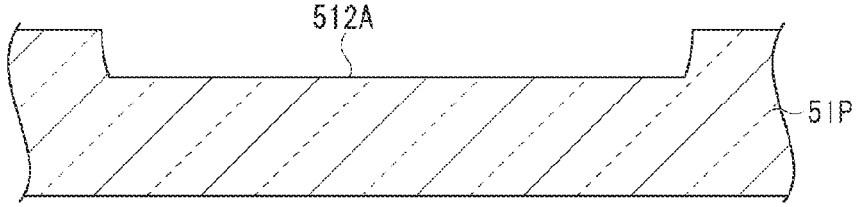
FIG.6C
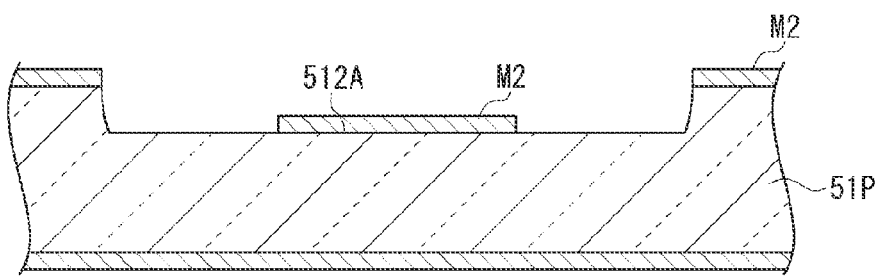
FIG.6D
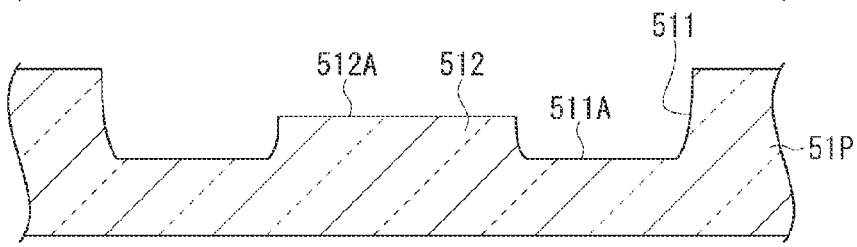
FIG.6E
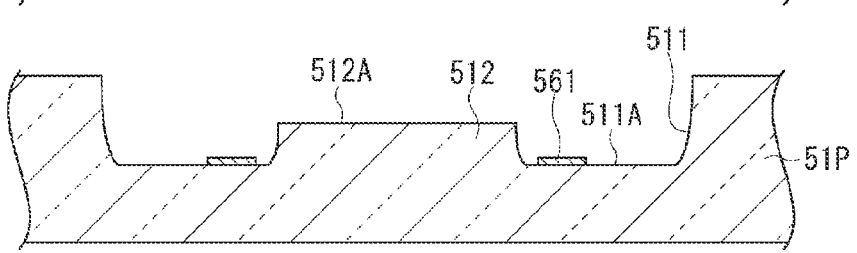
FIG.6F
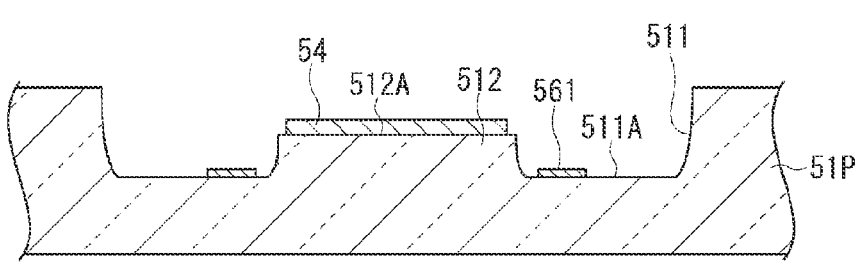

WAVELENGTH VARIABLE INTERFERENCE FILTER, MANUFACTURING METHOD OF WAVELENGTH VARIABLE INTERFERENCE FILTER, OPTICAL FILTER DEVICE, OPTICAL MODULE, AND ELECTRONIC APPARATUS

BACKGROUND

1. Technical Field

The present invention relates to a wavelength variable interference filter, a manufacturing method of a wavelength variable interference filter, an optical filter device, an optical module, and an electronic apparatus.

2. Related Art

In the related art, there has been known a wavelength variable interference filter in which reflection films are disposed to oppose each other on surfaces of a pair of substrates which oppose each other (for example, see JP-A-2011-197386).

The wavelength variable interference filter disclosed in JP-A-2011-197386 is a wavelength variable interference filter obtained by joining a lower substrate and an upper substrate to each other. A lower mirror is provided on a surface of the lower substrate opposing the upper substrate, and an upper mirror opposing the lower mirror is provided on a surface of the upper substrate opposing the lower substrate.

In addition, in the upper substrate, a diaphragm is provided in a region surrounding the upper mirror, in a plan view, and by displacing the diaphragm in a vertical direction, a dimension between the lower mirror and the upper mirror is displaced.

Herein, the diaphragm is obtained by performing wet etching on the upper substrate to form a groove.

However, in the wavelength variable interference filter using light of a visible light region as a target, glass through which light in the visible light region can be transmitted is generally used as the lower substrate and the upper substrate. In a case of forming the diaphragm by performing wet etching on such a glass-made upper substrate, as shown in FIG. 17, a mask M9 including an opening according to a shape of the diaphragm is used. In this case, by performing isotropic etching, the etching is performed not only in a depth direction, but also in a lateral direction from a mask opening end M91, and a side surface 926A which is formed of an arc-like curved surface around the mask opening end M91 is formed from a groove bottom surface 926B of the diaphragm to an upper surface (surface on which the mask is formed) of the upper substrate 92. Accordingly, there is a problem with the increase in size of the wavelength variable interference filter, for a size of a region D9 of the side surface 926A which is expanded further than the opening of the mask M9 in the lateral direction.

SUMMARY

An advantage of some aspect of the invention is to provide a wavelength variable interference filter which can be miniaturized, a manufacturing method of a wavelength variable interference filter, an optical filter device, an optical module, and an electronic apparatus.

A wavelength variable interference filter according to an aspect of the invention includes: a first substrate; a second substrate which is disposed to oppose the first substrate; a first reflection film which is provided on the first substrate and reflects a portion of incident light and transmits the other portion of the incident light; and a second reflection film which is provided on the second substrate and opposes the first reflection film and reflects a portion of incident light and transmits the other portion of the incident light, in which the second substrate includes a movable portion and a groove provided on the outside of the movable portion, in a plan view when the second substrate is seen from a substrate thickness direction, the groove includes a bottom surface having an even groove depth dimension and a side surface which is continued to the bottom surface, and the side surface is configured with a plurality of arc-like curved surface portions, in a cross-sectional view when the second substrate is cut along the substrate thickness direction.

In the aspect of the invention, the groove provided on the second substrate includes the bottom surface having an even groove depth dimension and the side surface which is continued to the bottom surface, and the side surface is configured with a plurality of arc-like curved surface portions, in a cross-sectional view when the second substrate is cut along the substrate thickness direction.

According to the configuration, it is possible to contract a region of the side surface of the groove in a plan view, compared to a case in which the side surface of the groove is configured with only one curved surface portion. Accordingly, it is possible to narrow a width of the groove, and to miniaturize the wavelength variable interference filter.

In the wavelength variable interference filter of the aspect of the invention, it is preferable that, in the cross-sectional view, an arc center point of the plurality of curved surface portions is positioned on a virtual linear line along the substrate thickness direction of the second substrate from a boundary of the bottom surface and the side surface.

According to this configuration, it is possible to further contract the region of the side surface of the groove in a plan view.

A manufacturing method of a wavelength variable interference filter according to another aspect of the invention includes: forming a first substrate and providing a first reflection film which reflects a portion of light and transmits the other portion of the light on the first substrate; forming a second substrate; forming a second reflection film which reflects a portion of light and transmits the other portion of the light in a movable portion formation region set on the second substrate; and joining the first substrate and the second substrate so that the first reflection film and the second reflection film oppose each other, in which the forming of the second substrate includes forming a groove which includes a bottom surface having an even groove depth dimension and a side surface which is continued to the bottom surface in the outside of the movable portion formation region, in a plan view when the second substrate is seen from a substrate thickness direction, and the forming of the groove includes forming a first mask of which a region corresponding to the bottom surface is opened, on a surface of the second substrate, performing wet etching of the second substrate using the first mask to form a first groove, forming a second mask of which a region corresponding to the bottom surface is opened, on a surface of the second substrate, after removing the first mask, and performing wet etching of the second substrate using the second mask to form a second groove.

For example, in a case of forming the groove on the second substrate by performing wet etching one time using the first mask, side etching of the substantially same dimension as the depth dimension of the groove is performed.

Meanwhile, in the aspect of the invention, the groove is formed by the performing wet etching of the second substrate using the first mask and the performing wet etching of the second substrate using the second mask. In addition, since the region of the second mask corresponding to the bottom surface of the groove is opened, a starting point of the side etching of performing wet etching of the second substrate using the second mask, is positioned on a virtual linear line along the substrate thickness direction of the second substrate from a boundary of the bottom surface and the side surface of the groove.

Accordingly, it is possible to shorten a side etching dimension, compared to the case of forming the groove having the same depth by performing wet etching one time using the first mask.

Therefore, it is possible to narrow a width of the groove formed on the second substrate, and to miniaturize the wavelength variable interference filter.

In the manufacturing method of the wavelength variable interference filter according to the aspect of the invention, it is preferable that the forming of the second mask includes forming a mask member which covers a side surface and a bottom surface configuring the first groove, on a surface of the second substrate on which the first groove is formed, forming a resist using a resist for electrophoretic deposition which covers the mask member as a material, on a surface of the second substrate on which the mask member is formed, patterning the formed resist, and forming the second mask by etching the mask member with the patterned resist as a mask.

In a case where a resist is formed on the surface of the second substrate on which the mask member is formed using a spin coating method, for example, the resist may not be properly fixed to the mask member which covers the side surface of the first groove.

Meanwhile, in the aspect of the invention, since the resist for electrophoretic deposition is used for the resist, it is possible to fix the resist to the mask member which covers the side surface of the first groove with high reliability. Accordingly, it is possible to precisely pattern the resist.

In the manufacturing method of the wavelength variable interference filter according to the aspect of the invention, it is preferable that the resist is a positive resist.

In a case where the resist which covers the mask member is a negative resist, for example, it is necessary to expose the resist on the side surface to light, to have remaining resist on the side surface of the first groove. However, since the light hardly approaches the side surface of the first groove, the resist on the side surface is not sufficiently exposed to the light, and as a result of the development, the resist on the side surface is removed, in some cases.

With respect to this, according to the aspect of the invention, since the resist is a positive resist, it is not necessary to expose the resist on the side surface to the light, to have the remaining resist on the side surface of the first groove. Accordingly, it is possible to further precisely perform the patterning of the resist.

An optical filter device according to still another aspect of the invention includes: a wavelength variable interference filter which includes a first substrate, a second substrate which is disposed to oppose the first substrate, a first reflection film which is provided on the first substrate and reflects a portion of incident light and transmits the other portion of the incident light, and a second reflection film which is provided on the second substrate, opposes the first reflection film, and reflects a portion of incident light and transmits the other portion of the incident light, and a housing which accommodates the wavelength variable interference filter, in which the second substrate includes a movable portion and a groove provided on the outside of the movable portion, in a plan view when the second substrate is seen from a substrate thickness direction, the groove includes a bottom surface having an even groove depth dimension and a side surface which is continued to the bottom surface, and the side surface is configured with a plurality of arc-like curved surface portions, in a cross-sectional view when the second substrate is cut along the substrate thickness direction.

In the aspect of the invention, in the same manner as the aspects described above, it is possible to narrow a width of the groove formed on the second substrate, and to miniaturize the wavelength variable interference filter. As a result, it is possible to miniaturize the optical filter device on which the wavelength variable interference filter is loaded. In addition, since the wavelength variable interference filter is accommodated in the housing, it is possible to suppress degradation of the reflection films due to gas or the like contained in the atmosphere or attachment of foreign materials.

An optical module according to yet another aspect of the invention includes: a first substrate; a second substrate which is disposed to oppose the first substrate; a first reflection film which is provided on the first substrate, and reflects a portion of incident light and transmits the other portion of the incident light; a second reflection film which is provided on the second substrate, opposes the first reflection film, and reflects a portion of incident light and transmits the other portion of the incident light; and a detection unit which detects light having a wavelength selected by interference of light incident between the first reflection film and the second reflection film, in which the second substrate includes a movable portion and a groove provided on the outside of the movable portion, in a plan view when the second substrate is seen from a substrate thickness direction, the groove includes a bottom surface having an even groove depth dimension and a side surface which is continued to the bottom surface, and the side surface is configured with a plurality of arc-like curved surface portions, in a cross-sectional view when the second substrate is cut along the substrate thickness direction.

In the aspect of the invention, in the same manner as the aspects described above, it is possible to narrow a width of the groove formed on the second substrate, and to miniaturize the optical module.

An electronic apparatus according to still yet another aspect of the invention includes: a wavelength variable interference filter which includes a first substrate, a second substrate which is disposed to oppose the first substrate, a first reflection film which is provided on the first substrate and reflects a portion of incident light and transmits the other portion of the incident light, and a second reflection film which is provided on the second substrate, opposes the first reflection film, and reflects a portion of incident light and transmits the other portion of the incident light; and a control unit which controls the wavelength variable interference filter, in which the second substrate includes a movable portion and a groove provided on the outside of the movable portion, in a plan view when the second substrate is seen from a substrate thickness direction, the groove includes a bottom surface having an even groove depth dimension and a side surface which is continued to the bottom surface, and the side surface is configured with a plurality of arc-like curved surface portions, in a cross-sectional view when the second substrate is cut along the substrate thickness direction.

In the aspect of the invention, in the same manner as the aspects described above, it is possible to narrow a width of the groove formed on the second substrate, and to miniaturize the wavelength variable interference filter. As a result, it is possible to miniaturize the electronic apparatus on which the wavelength variable interference filter is loaded.

BRIEF DESCRIPTION OF THE DRAWINGS

The invention will be described with reference to the accompanying drawings, wherein like numbers reference like elements.

FIGS. 6A to 6F are diagrams showing states of a first glass substrate of a fixed substrate forming step of FIG. 5.

DESCRIPTION OF EXEMPLARY EMBODIMENTS

First Embodiment

Hereinafter, a first embodiment according to the invention will be described with reference to the drawings.

Configuration of Spectrometry Apparatus

Figure 1:
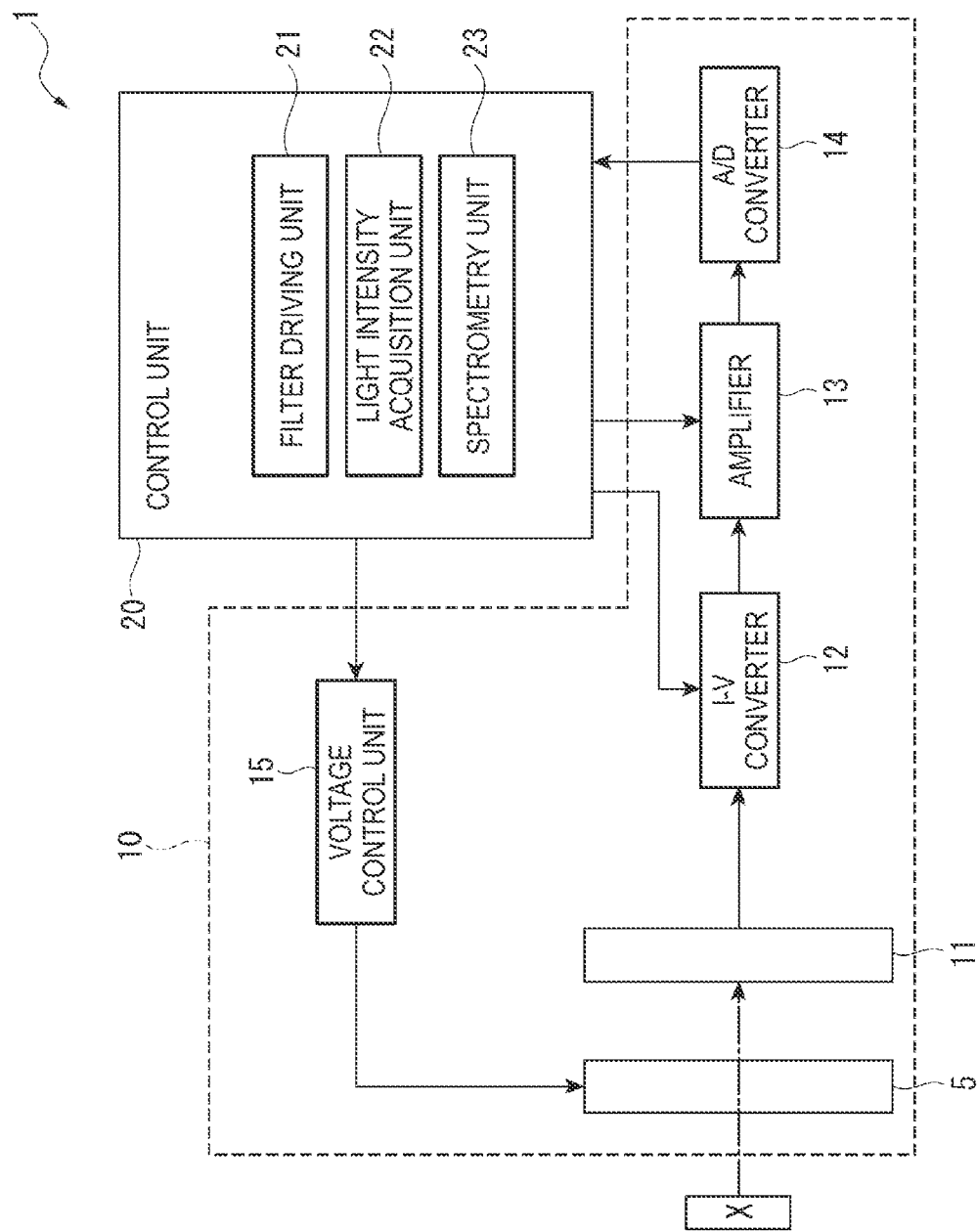
FIG. 1 is a block diagram showing a schematic configuration of a spectrometry apparatus according to a first embodiment of the invention.

FIG. 1 is a block diagram showing a schematic configuration of a spectrometry apparatus of the first embodiment according to the invention.

A spectrometry apparatus 1 is one example of an electronic apparatus according to the invention, and is an apparatus which measures a spectrum of measurement target light based on measurement target light which is reflected by a measurement target X. In the embodiment, an example of measuring the measurement target light which is reflected by the measurement target X is shown, however, in a case of usage of, for example, a light emitting body such as a liquid crystal panel, as the measurement target X, light emitted from the light emitting body may be used as the measurement target light.

As shown in FIG. 1, the spectrometry apparatus 1 includes an optical module 10 and a control unit 20.

Configuration of Optical Module

Next, a configuration of the optical module 10 will be described hereinafter.

As shown in FIG. 1, the optical module 10 includes a wavelength variable interference filter 5, a detector 11, an I-V converter 12, an amplifier 13, an A/D converter 14, and a voltage control unit 15.

The detector 11 receives light transmitted to the wavelength variable interference filter 5 of the optical module 10, and outputs a detection signal (current) according to light intensity of the received light.

The I-V converter 12 converts the detection signal input from the detector 11 into a voltage value, and outputs the voltage value to the amplifier 13.

The amplifier 13 amplifies a voltage (detection voltage) according to the detection signal input from the I-V converter 12.

The A/D converter 14 converts the detection voltage (analog signal) input from the amplifier 13 into a digital signal, and outputs the digital signal to the control unit 20.

Configuration of Wavelength Variable Interference Filter

Figure 2:
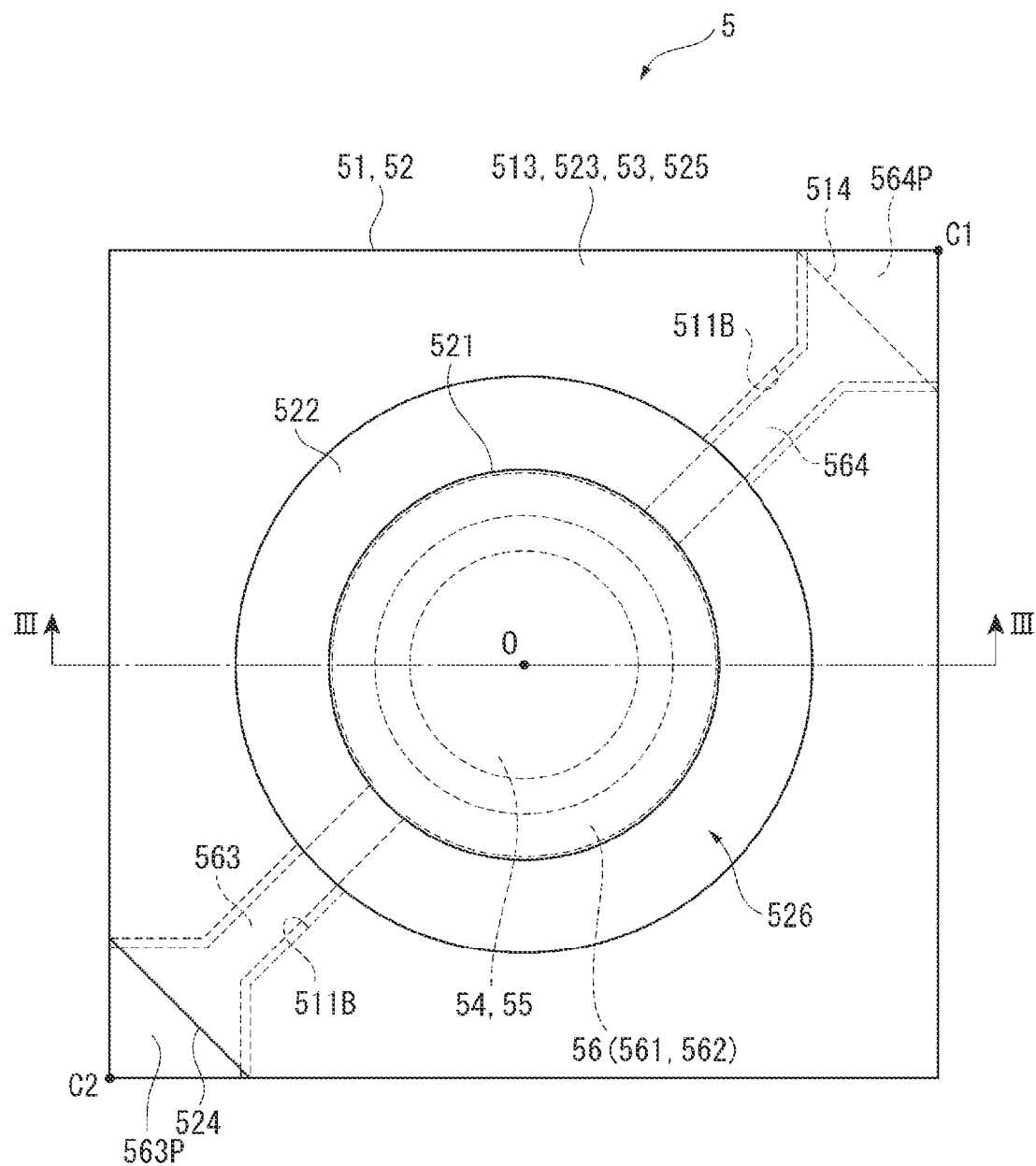
FIG. 2 is a plan view showing a schematic configuration of a wavelength variable interference filter of the embodiment.
Figure 3:
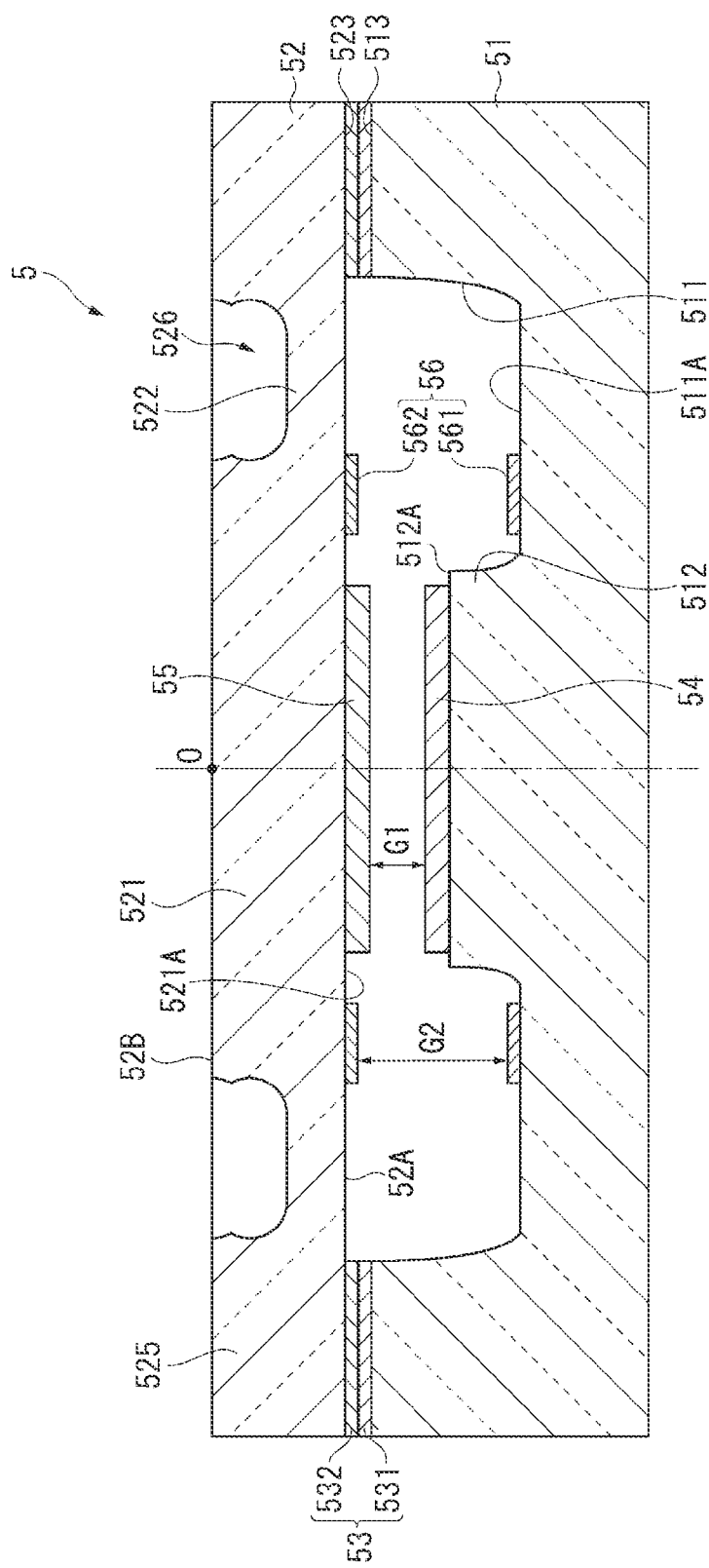
FIG. 3 is a cross-sectional view of a wavelength variable interference filter taken along line III-III of FIG. 2.

FIG. 2 is a plan view showing a schematic configuration of the wavelength variable interference filter 5 and FIG. 3 is a cross-sectional view of the wavelength variable interference filter 5 taken along line III-III of FIG. 2.

The wavelength variable interference filter 5 is configured by a manufacturing method of a wavelength variable interference filter according to the invention. The manufacturing method of a wavelength variable interference filter will be described later.

As shown in FIG. 2, the wavelength variable interference filter 5 is a plate-like optical member having a square planar shape, for example. As shown in FIG. 3, the wavelength variable interference filter 5 includes a fixed substrate 51 which is a first substrate according to the invention and a movable substrate 52 which is a second substrate according to the invention. The fixed substrate 51 and the movable substrate 52 are formed by various types of glass such as soda glass, crystalline glass, quartz glass, lead glass, potassium glass, borosilicate glass, or alkali-free glass, or a crystal. The fixed substrate 51 and the movable substrate 52 are integrally configured by joining a first joining portion 513 of the fixed substrate 51 and a second joining portion 523 of the movable substrate by a joining film 53 (first joining film 531 and second joining film 532) which is configured by a plasma-polymerized film or the like having siloxane as a main component, for example.

A fixed reflection film 54 configuring a first reflection film according to the invention is provided on the fixed substrate 51, and a movable reflection film 55 configuring a second reflection film according to the invention is provided on the movable substrate 52. The fixed reflection film 54 and the movable reflection film 55 are disposed to oppose each other through an inter-reflection film gap G1. An electrostatic actuator 56 which is used for adjusting the inter-reflection film gap G1 is provided on the wavelength variable interference filter 5. The electrostatic actuator 56 is configured with a fixed electrode 561 which is provided on the fixed substrate 51, and a movable electrode 562 which is provided on the movable substrate 52. The fixed electrode 561 and the movable electrode 562 oppose each other through an inter-electrode gap G2 (G2>G1). Herein, the electrodes 561 and 562 may have a configuration of being directly provided on substrate surfaces of the fixed substrate 51 and the movable substrate 52, respectively, or may have a configuration of being provided through the other film member.

In a plan view of the filter as shown in FIG. 2 which shows the wavelength variable interference filter 5 from a substrate thickness direction of the fixed substrate 51 (movable substrate 52), a plan center point O of the fixed substrate 51 and the movable substrate 52 corresponds to a center point of the fixed reflection film 54 and the movable reflection film 55, and corresponds to a center point of a movable portion 521, which will be described later.

For the following description, a plan view in which the wavelength variable interference film is seen from the substrate thickness direction of the fixed substrate 51 or the movable substrate 52, that is, a plan view in which the wavelength variable interference filter 5 is seen from a laminated direction of the fixed substrate 51, the joining film 53, and the movable substrate 52, is called a filter plan view.

Configuration of Fixed Substrate

The fixed substrate 51 is formed by processing a glass base material which is formed to have a thickness of 1 mm, for example. In detail, as shown in FIG. 3, an electrode disposition groove 511 and a reflection film installing portion 512 are formed on the fixed substrate 51 by etching. The fixed substrate 51 is formed to have a larger thickness dimension with respect to the movable substrate 52, and there is no bending of the fixed substrate 51 due to an electrostatic attractive force in applying a voltage between the fixed electrode 561 and the movable electrode 562 or internal stress of the fixed electrode 561.

In addition, a cut-out portion 514 is formed on an apex C1 (see FIG. 2) of the fixed substrate 51, and a movable electrode pad 564P, which will be described later, is exposed to the fixed substrate 51 side of the wavelength variable interference filter 5.

In the filter plan view, the electrode disposition groove 511 is formed in a circular shape around the plan center point O of the fixed substrate 51. The reflection film installing portion 512 is, in the plan view, formed to protrude to the movable substrate 52 side from a center portion of the electrode disposition groove 511. Herein, a groove bottom surface of the electrode disposition groove 511 is set to an electrode installing surface 511A on which the fixed electrode 561 is disposed. A protruded tip end surface of the reflection film installing portion 512 is set to a reflection film installing surface 512A.

In addition, in the fixed substrate 51, an electrode lead-out groove 511B (see FIG. 2) which extends towards the apex C1 and an apex C2 of an outer periphery of the fixed substrate 51 from the electrode disposition groove 511 is provided.

The fixed electrode 561 is provided on the electrode installing surface 511A of the electrode disposition groove 511. The fixed electrode 561 is provided in a region opposing the movable electrode 562 of the movable portion 521, which will be described later, among the electrode installing surface 511A. In addition, an insulting film for securing an insulating property between the fixed electrode 561 and the movable electrode 562 may be laminated on the fixed electrode 561.

A fixed lead-out electrode 563 which extends to the apex C2 direction from the outer periphery of the fixed electrode 561 is provided on the fixed substrate 51. An extended tip end portion (portion positioned on the apex C2 of the fixed substrate 51) of the fixed lead-out electrode 563 configures a fixed electrode pad 563P which is connected to the voltage control unit 15.

In the embodiment, the configuration in which one fixed electrode 561 is provided on the electrode installing surface 511A is shown, however, a configuration (double electrode configuration) in which two concentric electrodes around the plan center point O are provided, may be used, for example.

As described above, the reflection film installing portion 512 is formed in an approximately cylindrical shape to have a smaller radial dimension than the electrode disposition groove 511, coaxially with the electrode disposition groove 511, and includes a reflection film installing surface 512A of the reflection film installing portion 512 which opposes the movable substrate 52.

As shown in FIG. 3, the fixed reflection film 54 is installed on the reflection film installing portion 512. As the fixed reflection film 54, a metal film such as Ag or an alloy film such as Ag alloy can be used, for example. In addition, a dielectric multilayer film in which a high refractive layer is formed of $TiO_2$ and a low refractive layer is formed of $SiO_2$, for example, may be used. Further, a reflection film obtained by laminating the metal film (or alloy film) on the dielectric multilayer film, a reflection film obtained by laminating the dielectric multilayer film on the metal film (or alloy film), or a reflection film obtained by laminating a single-layered refractive layer ($TiO_2$ or $SiO_2$) and the metal film (or alloy film) may be used.

An antireflection film may be formed in a position corresponding to the fixed reflection film 54, on a light incident surface (surface on which the fixed reflection film 54 is provided) of the fixed substrate 51. This antireflection film can be formed by alternately laminating a low refractive index film and a high refractive index film, decreases a reflectance of the visible light on the surface of the fixed substrate 51, and increases transmittance thereof.

The first joining portion 513 is configured on the surface on which the electrode disposition groove 511, the reflection film installing portion 512, and the electrode lead-out groove 511B are not provided, by etching, among the surface of the fixed substrate 51 opposing the movable substrate 52. The first joining film 531 is provided on the first joining portion 513, and the first joining film 531 is joined with the second joining film 532 which is provided on the movable substrate 52. Accordingly, as described above, the fixed substrate 51 and the movable substrate 52 are joined with each other.

Configuration of Movable Substrate

The movable substrate 52 is formed by processing a glass base material which is formed to have a thickness of 600 μm, for example.

In detail, in the filter plan view as shown in FIG. 2, the movable substrate 52 includes the movable portion 521 having a circular shape around the plan center point O, a holding portion 522 which is provided coaxially with the movable portion 521 and holds the movable portion 521, and a substrate outer periphery portion 525 which is provided on an outer side of the holding portion 522.

In addition, as shown in FIG. 2, a cut-out portion 524 is formed on the movable substrate 52 with respect to the apex C2, and the fixed electrode pad 563P is exposed when the wavelength variable interference filter 5 is seen from the movable substrate 52 side.

The movable portion 521 is formed to have a larger thickness dimension than the holding portion 522, and for example, in the embodiment, the movable portion 521 is formed to have the same thickness dimension as the movable substrate 52. In the filter plan view, the movable portion 521 is formed to have at least a larger radial dimension than a radial dimension of the outer periphery of the reflection film installing surface 512A. The movable electrode 562 and the movable reflection film 55 are provided on the movable portion 521.

In the same manner as the fixed substrate 51, an antireflection film may be formed on the surface of the movable portion 521 on a side opposite to the fixed substrate 51. Such an antireflection film can be formed by alternately laminating a low refractive index film and a high refractive index film, decreases a reflectance of the visible light on the surface of the movable substrate 52, and increases transmittance thereof.

The movable electrode 562 is formed to oppose the fixed electrode 561 through the inter-electrode gap G2 (G2>G1) and in a circular shape to be the same shape as the fixed electrode 561, on a surface 52A of the movable substrate 52 opposing the fixed substrate 51. In addition, a movable lead-out electrode 564 which extends to the apex C1 of the movable substrate 52 from the outer periphery of the movable electrode 562 is provided on the movable substrate 52. An extended tip end portion (portion positioned on the apex C1 of the movable substrate 52) of the movable lead-out electrode 564 configures a movable electrode pad 564P which is connected to the voltage control unit 15.

The movable reflection film 55 is provided on the center portion of the movable surface 521A of the movable portion 521, to oppose the fixed reflection film 54 through the inter-reflection film gap G1. As the movable reflection film 55, a reflection film having the same configuration as the fixed reflection film 54 described above is used.

In the embodiment, the configuration in which the inter-reflection film gap G1 is smaller than the inter-electrode gap G2 is used as an example, however, it is not limited thereto. That is, the dimensions of the inter-reflection film gap G1 and the inter-electrode gap G2 can be determined by a wavelength region of light extracted by the wavelength variable interference filter 5, the inter-reflection film gap G1 and the inter-electrode gap G2 may have the same dimension, or the inter-reflection film gap G1 may be set larger than the inter-electrode gap G2, for example.

Figure 4:
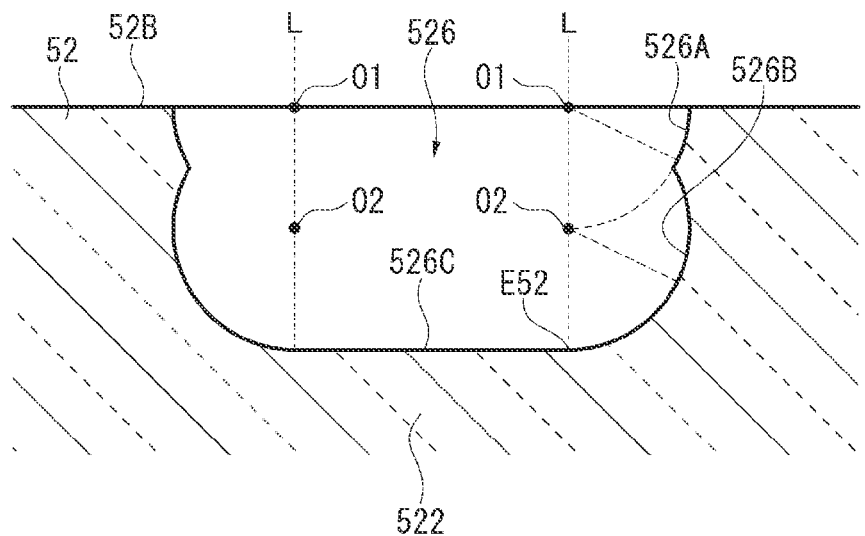
FIG. 4 is an enlarged view of a vicinity of a groove of a movable substrate of FIG. 3.

In addition to the movable portion 521, in a filter plan view, a circular groove 526 is formed on a surface 52B side which is opposite to the surface 52A of the movable substrate 52. FIG. 4 is an enlarged view of a vicinity of the groove of the movable substrate of FIG. 3. As shown in FIG. 4, the groove 526 is configured with a bottom surface 526C having an even groove depth dimension, and a side surface which continues to the bottom surface 526C. The side surface includes a first curved surface portion 526A and a second curved surface portion 526B.

The first curved surface portion 526A is a surface which is continued from the surface 52B of the movable substrate 52. The first curved surface portion 526A is a curved surface portion which is on the same flat surface as the surface 52B and which is formed in an arc shape around a virtual first point O1 which is overlapped with an end portion E52 of the bottom surface 526C, in a filter plan view.

The second curved surface portion 526B is a surface which is continued from the bottom surface 526C. The second curved surface portion 526B is a curved surface which is positioned on the bottom surface 526C side with respect to the first point O1 and which is formed in an arc shape around a virtual second point O2 which is overlapped with an end portion E52 of the bottom surface 526C, in the filter plan view.

That is, the end portion E52 of the bottom surface 526C corresponds to a boundary of the bottom surface 526C and the second curved surface portion 526B. The first point O1 and the second point O2 are positioned on a virtual linear line L along a thickness direction of the movable substrate 52 from the end portion E52.

Herein, the second point O2 is positioned on the extension of the arc of the first curved surface portion 526A.

As described above, the holding portion 522 is obtained by forming the groove 526 on the movable substrate 52.

The holding portion 522 is a diaphragm surrounding the vicinity of the movable portion 521 and is formed to have a smaller thickness dimension than that of the movable portion 521.

Such a holding portion 522 is easily bent more than the movable portion 521, and can displace the movable portion 521 to the fixed substrate 51 side with a slight electrostatic attractive force. At that time, since the movable portion 521 has a greater thickness dimension and greater rigidity than those of the holding portion 522, shape change of the movable portion 521 does not occur, even in a case where the holding portion 522 is pulled to the fixed substrate 51 side with the electrostatic attractive force. Accordingly, the bending of the movable reflection film 55 provided on the movable portion 521 does not occur, and it is possible to maintain the fixed reflection film 54 and the movable reflection film 55 in a parallel state, at all times.

In the embodiment, the example of the holding portion 522 having a diaphragm shape is shown, however, it is not limited thereto. For example, beam-like holding portions which are disposed at intervals of an equal angle may be provided around the plan center point O.

As described above, the substrate outer periphery portion 525 is provided on the outer side of the holding portion 522 in the filter plan view. The second joining portion 523 opposing the first joining portion 513 is provided on the surface of the substrate outer periphery portion 525 opposing the fixed substrate 51. The second joining film 532 is provided on the second joining portion 523, and as described above, the second joining film 532 is joined with the first joining film 531, and accordingly, the fixed substrate 51 and the movable substrate 52 are joined with each other.

Configuration of Voltage Control Unit

The voltage control unit 15 is connected to the fixed lead-out electrode 563 (fixed electrode pad 563P) and the movable lead-out electrode 564 (movable electrode pad 564P) of the wavelength variable interference filter 5.

When receiving a voltage command signal corresponding to a measurement target wavelength from the control unit 20, the voltage control unit 15 applies corresponding voltage between the fixed lead-out electrode 563 and the movable lead-out electrode 564. Accordingly, an electrostatic attractive force is generated on the electrostatic actuator 56 (between fixed electrode 561 and the movable electrode 562) of the wavelength variable interference filter 5 based on the applied voltage, and the movable portion 521 is displaced to the fixed substrate 51 side to change the size of the inter-reflection film gap G1.

Configuration of Control Unit

The control unit 20 is configured by combination of a CPU or a memory, for example, and controls the entire operations of the spectrometry apparatus 1. As shown in FIG. 1, the control unit 20 includes a filter driving unit 21, a light intensity acquisition unit 22, and a spectrometry unit 23.

In addition, the control unit 20 includes a memory unit (not shown) which stores various data items, and V-X, data for controlling the electrostatic actuator 56 is stored in the memory unit.

A peak wavelength (λ) of light which transmits the wavelength variable interference filter 5, with respect to voltage (V) which is applied to the electrostatic actuator 56 is recorded in the V-λ data.

The filter driving unit 21 sets a target wavelength of the light extracted by the wavelength variable interference filter 5, and reads a target voltage value corresponding to the target wavelength set from the V-λ data stored in the memory unit. The filter driving unit 21 outputs a control signal which indicates applying of the read target voltage value to the voltage control unit 15. Accordingly, a voltage of the target voltage value is applied to the electrostatic actuator 56 from the voltage control unit 15.

The light intensity acquisition unit 22 acquires light intensity of the light of target wavelength transmitted the wavelength variable interference filter 5, based on the light intensity acquired by the detector 11.

The spectrometry unit 23 measures spectrum properties of the measurement target light, based on the light intensity acquired by the light intensity acquisition unit 22.

As a spectrometry method of the spectrometry unit 23, for example, a method of measuring an optical spectrum with light intensity detected by the detector 11 with respect to the measurement target wavelength as the light intensity of the measurement target wavelength, or a method of estimating an optical spectrum based on the light intensity of the plurality of measurement target wavelengths, is used.

In the method of estimating the optical spectrum, for example, a measurement spectral matrix in which each light intensity with respect to the plurality of measurement target wavelengths is set to a matrix element is generated, and by operating a predetermined conversion matrix with respect to the measurement spectrum matrix, the optical spectrum of the light which is the measurement target is estimated. In this case, the plurality of sample lights with a known optical spectrum is measured by the spectrometry apparatus 1, and the conversion matrix is set so as to have a minimum deviation of the matrix obtained by operating the conversion matrix to the measurement spectrum matrix generated based on the light intensity obtained by the measurement, and the known optical spectrum.

Manufacturing Method of Wavelength Variable Interference Filter

Next, a manufacturing method of the wavelength variable interference filter 5 described above will be described with reference to the drawing.

Figure 5:
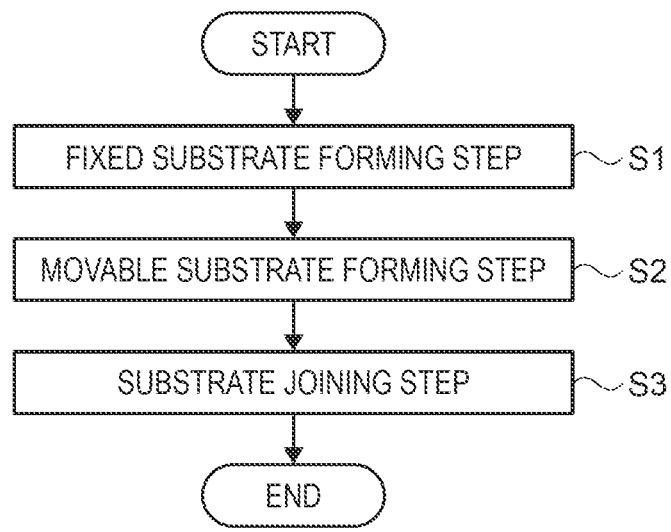
FIG. 5 is a flowchart showing a manufacturing step of a wavelength variable interference filter of the embodiment.

FIG. 5 is a flowchart showing manufacturing steps of the wavelength variable interference filter 5.

In the manufacturing of the wavelength variable interference filter 5, first, a first glass substrate 51P for forming the fixed substrate 51 and a second glass substrate 52P for forming the movable substrate 52 are prepared, and a fixed substrate forming step S1 and a movable substrate forming step S2 are performed. After that, a substrate joining step S3 is performed to join the first glass substrate 51P which is processed by the fixed substrate forming step S1 and the second glass substrate 52P which is processed by the movable substrate forming step S2 with each other, and the wavelength variable interference filter 5 is cut out in a chip unit.

Hereinafter, the steps S1 to S3 will be described with reference to the drawings.

Fixed Substrate Forming Step

FIGS. 6A to 6F are diagrams showing states of the first glass substrate 51P of the fixed substrate forming step S1.

In the fixed substrate forming step S1, first, both surfaces of the first glass substrate 51P (for example, having a thickness dimension of 1 mm) which is a manufacturing material of the fixed substrate 51, are subjected to precision polishing until surface roughness Ra becomes equal to or less than 1 nm.

After that, as shown in FIG. 6A, a first mask layer M1 (resist) is applied onto both surfaces (entire surface) of the first glass substrate 51P, the applied first mask layer M1 is exposed to light and developed by a photolithography method, and is patterned so that the portions for forming the electrode disposition groove 511, the electrode lead-out groove 511B (not shown), and the reflection film installing portion 512 are opened. Herein, in the embodiment, the plurality of fixed substrates 51 are formed from one first glass substrate 51P. Accordingly, in this step, a resist pattern is formed so as to manufacture the plurality of fixed substrates 51 on the first glass substrate 51P in a state of parallel arrangement in an array pattern.

Next, as shown in FIG. 6B, the first glass substrate 51P is subjected to etching until reaching a depth dimension of, for example, 0.5 μm. As the etching herein, wet etching is performed using a hydrofluoric acid etching liquid such as a hydrofluoric acid aqueous solution, for example. Accordingly, the reflection film installing surface 512A is formed on the first glass substrate 51P.

Then, after removing the first mask layer M1, a second mask layer M2 (resist) for forming the electrode disposition groove 511 is formed on the entire surface of the first glass substrate 51P. As shown in FIG. 6C, the patterning is performed so that the portions for forming the electrode disposition groove 511 (and electrode lead-out groove 511B) are opened. Herein, the example of removing the first mask layer M1 to newly form the second mask layer M2 is shown, however, for example the second mask layer M2 may be newly formed only on the formation position of the reflection film installing portion 512, without removing the first mask layer M1.

The first glass substrate 51P is subjected to wet etching to form the electrode disposition groove 511 and the electrode lead-out groove 511B (not shown). At that time, for example, the wet etching is performed so that the electrode installing surface 511A is positioned in a position (position in which the depth dimension from the upper surface of the first glass substrate 51P is 1.5 μm) in which the depth dimension from the reflection film installing surface 512A is 1 μm. After that, the second mask layer M2 is removed.

Accordingly, as shown in FIG. 6D, the substrate shape of the fixed substrate 51 in which the electrode disposition groove 511, the electrode lead-out groove 511B (not shown), and the reflection film installing portion 512 are formed, is determined.

Next, the first film forming step according to the invention is performed.

In the first film forming step, for example, a film is formed using an electrode material for forming the fixed electrode 561 on the first glass substrate 51P. As the fixed electrode 561 and the fixed lead-out electrode 563, any electrode material may be used, however, in the embodiment, an ITO film having a thickness of 0.1 μm is formed using a sputtering method or the like. After that, by patterning the electrode material, as shown in FIG. 6E, the fixed electrode 561 and the fixed lead-out electrode 563 (not shown) are formed. In this patterning, for example, the resist patterning is performed in the formation position of the fixed electrode 561 and the fixed lead-out electrode 563, on the formed ITO. The ITO is etched using a mixed liquid of nitric acid and hydrochloric acid, and the resist pattern is removed after the etching.

In addition, in a case of forming an insulating layer on the fixed electrode 561, after forming the fixed electrode 561, an insulating film (for example, TEOS or $SiO_2$) having a thickness of, for example, approximately 100 nm is formed on the entire surface of the fixed substrate 51 opposing the movable substrate 52 by plasma CVD or the like, for example. The insulating film on the fixed electrode pad 563P is removed by dry etching or the like, for example.

Next, as shown in FIG. 6F, the fixed reflection film 54 is provided on the reflection film installing surface 512A. Herein, in the embodiment, Ag alloy is used as the fixed reflection film 54. In a case of using a metal film such as Ag alloy or an alloy film such as Ag alloy as the fixed reflection film 54, the layer of the fixed reflection film 54 is formed on the surface on which the electrode disposition groove 511 or the reflection film installing portion 512 of the first glass substrate 51P is formed, and then patterning is performed using the photolithography method or the like.

In a case of forming a dielectric multilayer film as the fixed reflection film 54, the film can be formed by a lift-off process. In this case, the resist (lift-off pattern) is formed on a portion other than the reflection film forming portion on the fixed substrate 51, by the photolithography method or the like. After that, a film is formed using the material (for example, dielectric multilayer film in which a high refractive layer is formed of $TiO_2$ and a low refractive layer is formed of $SiO_2$) for forming the fixed reflection film 54 by a sputtering method or a vapor deposition method. After forming the fixed reflection film 54, the film on the unnecessary portion is removed by the lift-off process.

In addition, in a case of using the fixed reflection film 54 in which the metal film or the metal alloy film are further laminated on the dielectric multilayer film, or in a case of using the fixed reflection film 54 in which the metal film or the metal alloy film is laminated on the dielectric film (for example, high refractive layer such as $TiO_2$ or $Ta_2O_5$), after forming the dielectric multilayer film (dielectric film) by the lift-off process as described above, the metal film or the metal alloy film is formed by the sputtering method or the vapor deposition method, and patterned using the photolithography method.

In doing so, the first glass substrate 51P in which the plurality of fixed substrates 51 are disposed in an array pattern, is formed.

Movable Substrate Forming Step

Next, the movable substrate forming step S2 will be described. FIGS. 7A to 9B are diagrams showing states of the second glass substrate 52P of the movable substrate forming step S2.

In the movable substrate forming step S2, first, both surfaces of the second glass substrate 52P (for example, having a thickness dimension of 0.6 mm) which is a manufacturing material of the fixed substrate 52, are subjected to precision polishing until the surface roughness Ra becomes equal to or less than 1 nm.

Figure 7A:
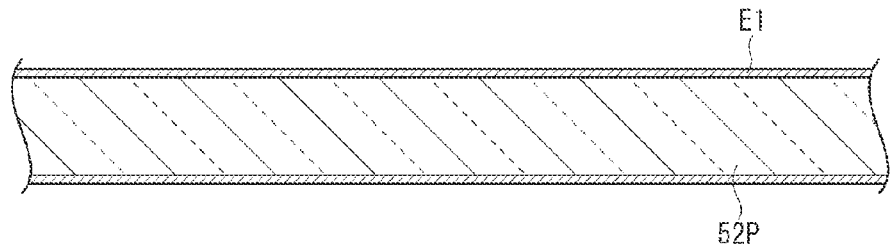
FIGS. 7A to 7E are diagrams showing states of a second glass substrate of a movable substrate forming step of FIG. 5.

Then, as shown in FIG. 7A, a laminated film E1 of Cr film/Au film is formed on both surfaces of the second glass substrate 52P by the sputtering method. Herein, the film thickness dimension of the Cr film and the Au film is not particularly limited, however, in the embodiment, the Cr film is formed to have a thickness of 50 nm and the Au film is formed to have a thickness of 500 nm.

Figure 7B:
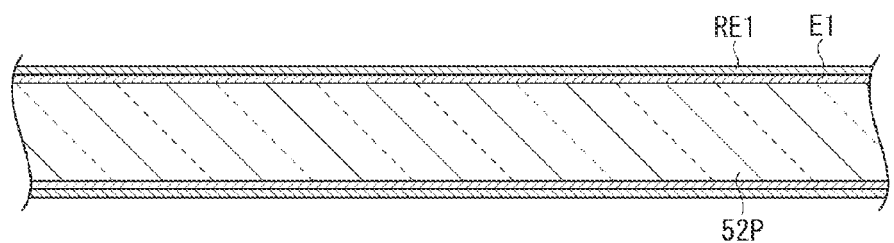

Next, as shown in FIG. 7B, the resist is applied on both surfaces of the second glass substrate 52P by a spin coating method to form a resist RE1 which covers the laminated film E1.

Figure 7C:
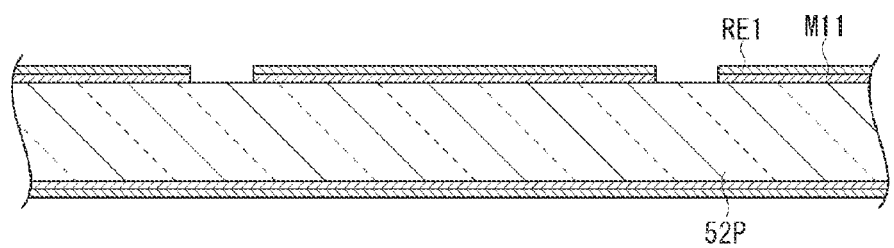

Next, as shown in FIG. 7C, the resist RE1 is exposed to light and developed by the photolithography method, and is patterned so that a region corresponding to the bottom surface 526C of the groove 526 of the movable substrate 52 is opened. Herein, in the embodiment, the plurality of movable substrate 52 are formed from one second glass substrate 52P. Accordingly, in this step, a resist pattern is formed so as to manufacture the plurality of movable substrates 52 on the second glass substrate 52P in a state of parallel arrangement in an array pattern.

The laminated film E1 is etched using the patterned resist RE1 to form a first mask M11. At that time, the Au film configuring the laminated film E1 is etched using a mixed liquid of iodine and potassium iodide, and the Cr film is etched using an aqueous solution of ammonium cerium nitrate.

Figure 7D:
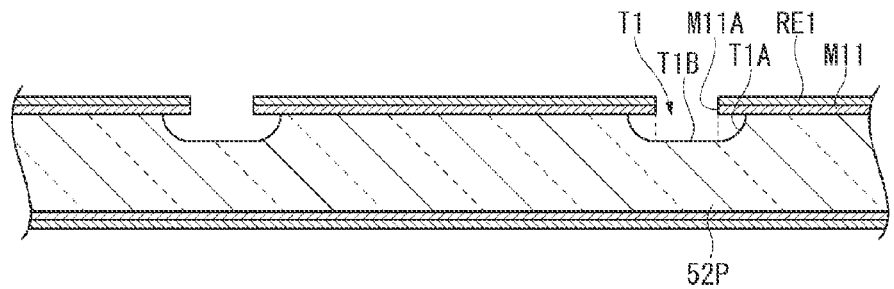

Next, as shown in FIG. 7D, the second glass substrate 52P is subjected to wet etching using buffered hydrofluoric acid, with the patterned resist RE1 and the first mask M11, as the mask (first etching step). An etching dimension in the depth direction is, for example, 0.3 mm. Accordingly, a first groove T1 which is configured with a bottom surface T1B corresponding to the opening of the first mask M11 and a side surface T1A which connects the bottom surface T1B and the upper surface of the second glass substrate 52P, is formed on the second glass substrate 52P.

Herein, side etching of the substantially same dimension as the depth of the first groove T1 is performed by the isotropic etching. Therefore, the side surface T1A is a curved surface which is formed in an arc shape around an opening end M11A of the first mask M11.

The opening end M11A of the first mask M11 corresponds to the virtual first point O1 of the movable substrate 52, and the side surface T1A configures the first curved surface portion 526A of the groove 526 of the movable substrate 52.

Figure 7E:
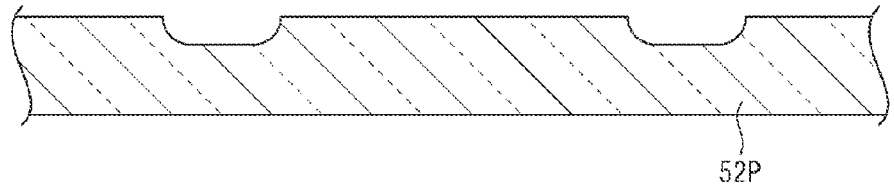

Then, as shown in FIG. 7E, the patterned resist RE1 and the first mask M11 are removed.

Figure 8A:
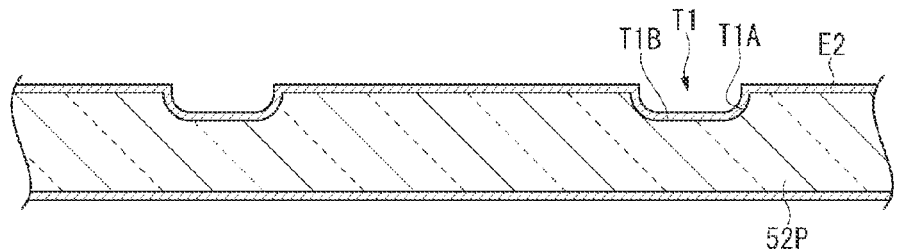
FIGS. 8A to 8E are diagrams showing states of a second glass substrate of a movable substrate forming step of FIG. 5.

Next, as shown in FIG. 8A, a laminated film E2 of Cr film/Au film which covers the side surface T1A and the bottom surface T1B configuring the first groove T1 is formed on both surfaces of the second glass substrate 52P by the sputtering method. Herein, the film thickness dimension of the Cr film and the Au film is not particularly limited, however, in the embodiment, the Cr film is formed to have a thickness of 50 nm and the Au film is formed to have a thickness of 500 nm.

Figure 8B:
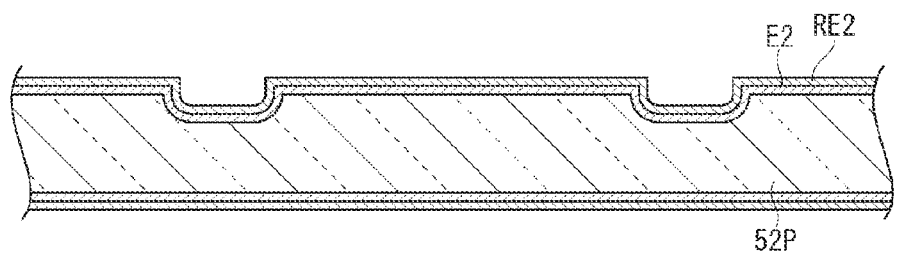

Next, as shown in FIG. 8B, a resist RE2 which covers the laminated film E2 is formed with a resist for electrophoretic deposition as a material, on both surfaces of the second glass substrate 52P. Herein, the resist RE2 is a positive resist.

Figure 8C:
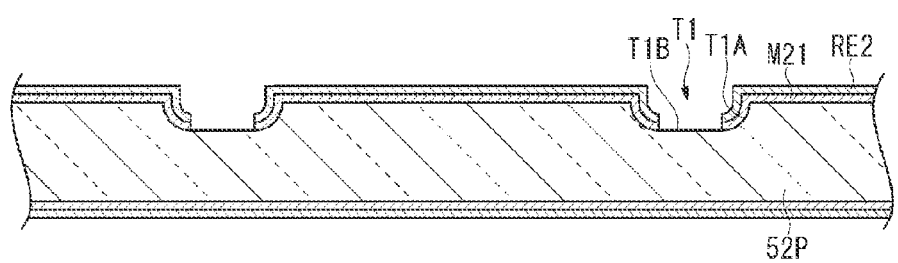

Next, as shown in FIG. 8C, the resist RE2 is exposed to light and developed by the photolithography method, and is patterned so that a region corresponding to the bottom surface 526C of the groove 526 of the movable substrate 52 is opened.

The laminated film E2 is etched using the patterned resist RE2 to form a second mask M21. At that time, the Au film configuring the laminated film E2 is etched using a mixed liquid of iodine and potassium iodide, and the Cr film is etched using an aqueous solution of ammonium cerium nitrate.

Figure 8D:
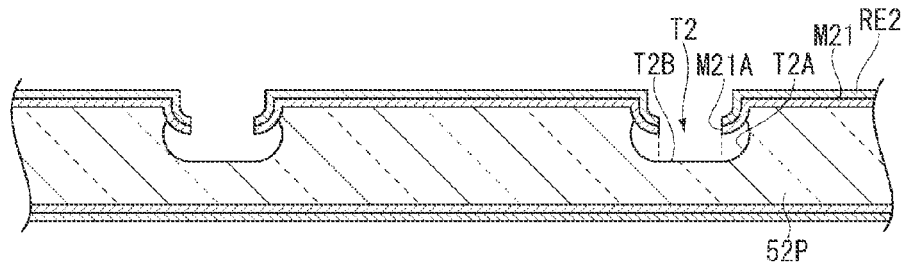

Next, as shown in FIG. 8D, the second glass substrate 52P is subjected to wet etching using buffered hydrofluoric acid, with the patterned resist RE2 and the second mask M21, as the mask (second etching step). An etching dimension in the depth direction is, for example, 0.27 mm. Accordingly, a second groove T2 which is configured with a bottom surface T2B corresponding to the opening of the second mask M21 and a side surface T2A which connects the bottom surface T2B and the upper surface of the second glass substrate 52P, is formed on the second glass substrate 52P.

Herein, side etching of the substantially same dimension as the depth of the second groove T2 is performed by the isotropic etching. Therefore, the side surface T2A is a curved surface which is formed in an arc shape around an opening end M21A of the second mask M21.

The opening end M21A of the second mask M21 corresponds to the virtual second point O2 of the movable substrate 52, the bottom surface T2B corresponds to the bottom surface 526C of the groove 526 of the movable substrate 52, and the side surface T2A corresponds to the second curved surface portion 526B of the groove 526 of the movable substrate 52.

Figure 8E:
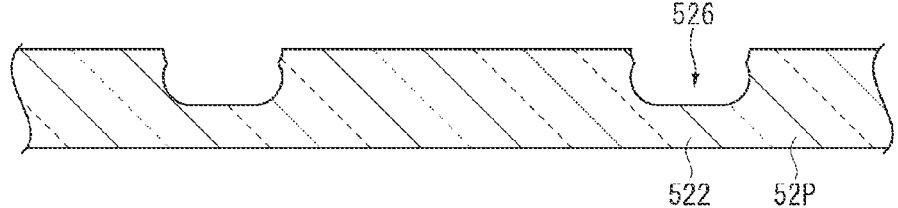

Next, as shown in FIG. 8E, the patterned resist RE2 and the second mask M21 are removed.

Accordingly, the groove 526 is formed on the second glass substrate 52P, and the holding portion 522 having a thickness of, for example, 30 μm is obtained.

Figure 9A:
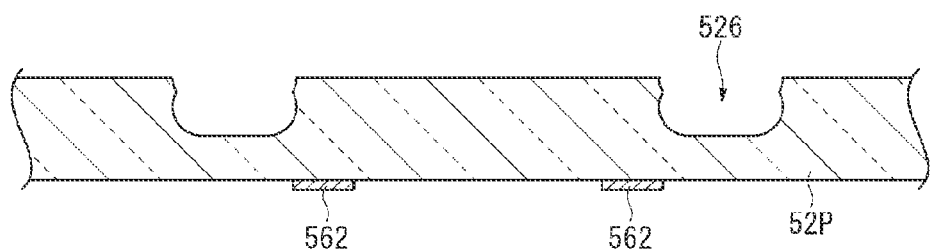
FIGS. 9A and 9B are diagrams showing states of a second glass substrate of a movable substrate forming step of FIG. 5.

Next, as shown in FIG. 9A, the movable electrode 562 and the movable lead-out electrode 564 (not shown) are formed on the surfaces of the second glass substrate 52P on a side opposite to the surface on which the groove 526 is formed. In the formation of the movable electrode 562 and the movable lead-out electrode 564, the same method as when forming the fixed electrode 561 of the first glass substrate 51P can be used.

Figure 9B:
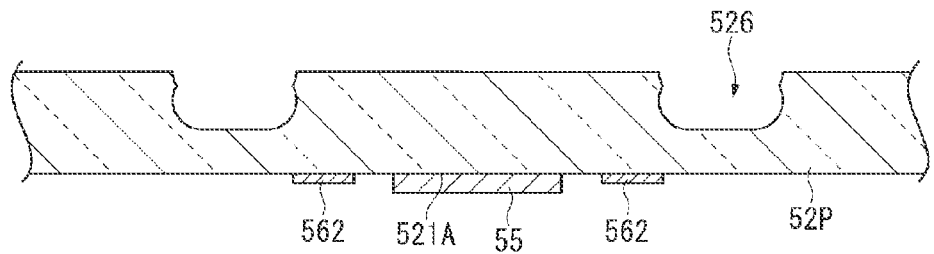

After that, as shown in FIG. 9B, the movable reflection film 55 is formed on the movable surface 521A. The movable reflection film 55 can also be formed by the same method as that of the fixed reflection film 54 of the first glass substrate 51P.

As described above, the second glass substrate 52P in which the plurality of movable substrates 52 are disposed in an array pattern, is formed.

Substrate Joining Step

Figure 10:
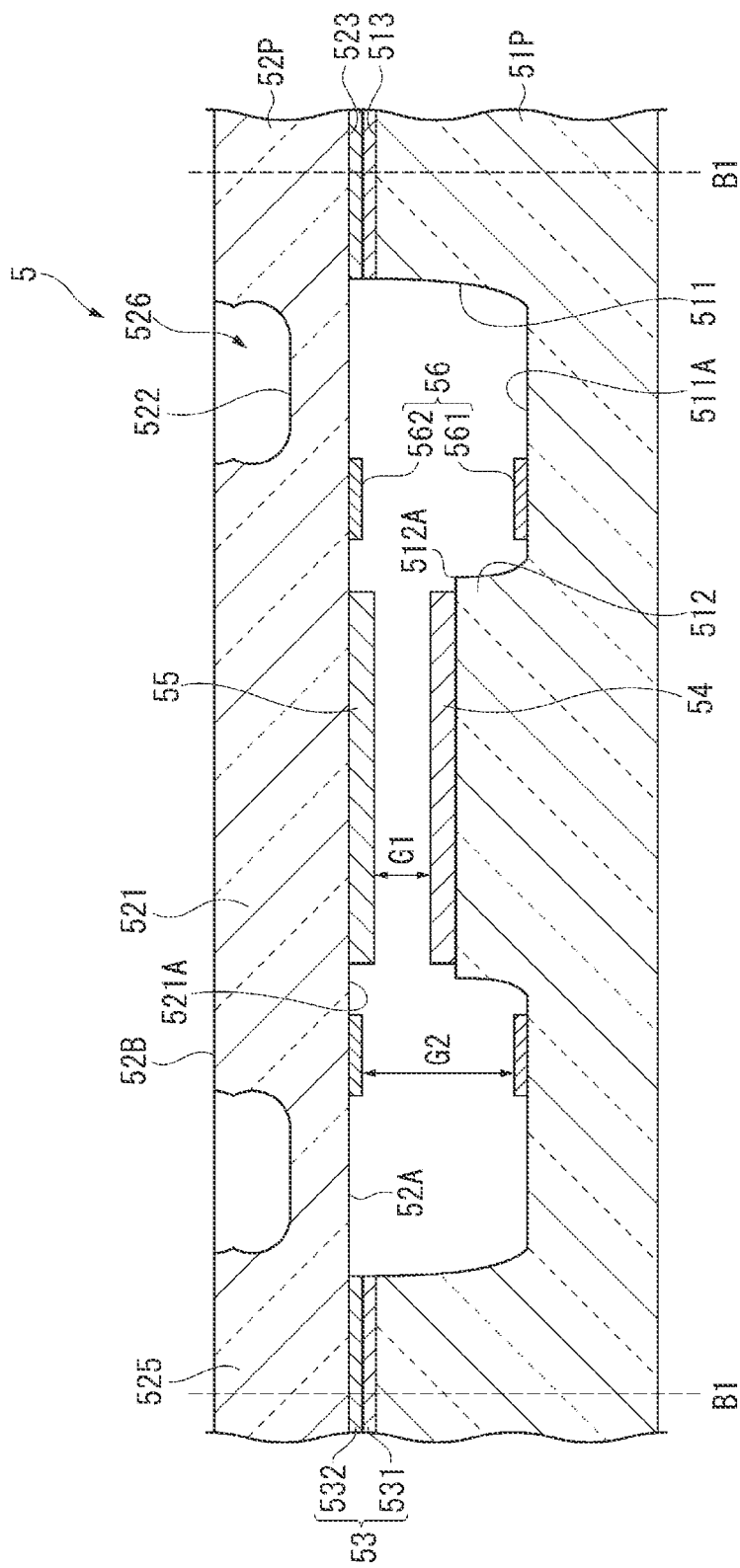
FIG. 10 is a diagram showing a substrate joining step of FIG. 5.

Next, the substrate joining step S3 will be described. FIG. 10 is a diagram showing a state of the first glass substrate 51P and the second glass substrate 52P of the substrate joining step S3.

In the substrate joining step S3, first, a plasma-polymerized film (joining film 53) having polyorganosiloxane as a main component is formed on the first joining portion 513 of the first glass substrate 51P and the second joining portion 523 of the second glass substrate 52P, by plasma CVD, for example. A thickness of the joining film 53 may be set, for example, from 10 nm to 1000 nm.

For applying activation energy with respect to the plasma-polymerized film of the first glass substrate 51P and the second glass substrate 52P, a plasma process or a UV process is performed. In a case of the plasma process, RF plasma using $O_2$, $N_2$, Ar, or the like as processing gas is emitted, and in a case of the UV process, an excimer UV (wavelength of 172 nm) is used as a UV light source.

After applying the activation energy to the plasma-polymerized film, alignment adjustment of the first glass substrate 51P and the second glass substrate 52P is performed, the first glass substrate 51P and the second glass substrate 52P are superimposed with each other through the plasma-polymerized film, and a load of 98 (N), for example, is applied to the joining portion for 10 minutes. Accordingly, the first glass substrate 51P and the second glass substrate 52P are joined with each other.

After that, a cutting step of extracting the wavelength variable interference filter 5 in a chip unit is performed. In detail, a joined body of the first glass substrate 51P and the second glass substrate 52P is cut along a line B1 shown in FIG. 10. For the cutting process, laser cutting or the like can be used, for example. In doing so, the wavelength variable interference filter 5 in a chip unit is manufactured.

Operating Effect of First Embodiment

In the wavelength variable interference filter 5 of the embodiment, the side surface of the groove 526 is configured with the first curved surface portion 526A and the second curved surface portion 526B, and the first point O1 and the second point O2 which are the center points of the first curved surface portion 526A and the second curved surface portion 526B are positioned on the virtual linear line L along the substrate thickness direction of the movable substrate 52 from the end portion E52 of the bottom surface 526C of the groove 526.

According to this configuration, the region of the side surface of the groove 526 in a plan view can be contracted, compared to the case where the side surface of the groove 526 is configured only with one curved surface portion. Accordingly, the width of the groove 526 can be narrowed, and the wavelength variable interference filter 5 can be miniaturized.

In addition, in the manufacturing method of the wavelength variable interference filter 5 of the embodiment, the groove 526 is formed by the first etching step and the second etching step. Further, in the second mask M21, since the region corresponding to the bottom surface 526C of the groove 526 is opened, a starting point of the side etching of the second etching step is positioned on the virtual linear line along the substrate thickness direction of the second glass substrate 52P from the end portion E52 of the bottom surface 526C of the groove 526.

Accordingly, the side etching dimension can be shortened, compared to the case where the groove 526 having the same depth is formed by the wet etching once using the first mask M11.

For example, the depth dimension of the etching of the first etching step and the depth dimension of the etching of the second etching step are set to be substantially the same as each other, and accordingly, the side etching dimension can be substantially halved.

Therefore, the width of the groove 526 can be narrowed, and the wavelength variable interference filter 5 can be miniaturized.

The resist for electrophoretic deposition is used for the resist RE2 formed on the second glass substrate 52P on which the first groove T1 is formed.

For example, in a case where the resist RE2 is formed using the spin coating method, the resist RE2 may not be properly fixed to the laminated film E2 which covers the side surface T1A of the first groove T1.

With respect to this, in the invention, since the resist for electrophoretic deposition is used for resist RE2, it is possible to fix the resist RE2 to the laminated film E2 which covers the side surface T1A of the first groove T1 with high reliability. Accordingly, it is possible to precisely perform the patterning of the resist RE2.

In addition, a positive resist is used for the resist RE2.

For example, in a case where the resist RE2 is a negative type resist, it is necessary to expose the resist RE2 on the side surface T1A to the light, for the resist RE2 on the side surface T1A of the first groove T1 to remain. However, since the light hardly approaches the side surface T1A, the resist RE2 on the side surface T1A is not sufficiently exposed to the light, and as a result of the development, the resist RE2 on the side surface T1A is removed, in some cases.

With respect to this, according to the invention, since the resist RE2 is a positive type resist, it is not necessary to expose the resist RE2 on the side surface T1A to the light, for the resist RE2 on the side surface T1A to remain. Accordingly, it is possible to further precisely perform the patterning of the resist RE2.

Second Embodiment

Next, a second embodiment of the invention will be described with reference to the drawings.

In the spectrometry apparatus 1 of the first embodiment, the wavelength variable interference filter 5 is directly provided with respect to the optical module 10. However, the optical module has a complicated configuration, and it is difficult to directly provide the wavelength variable interference filter 5, particularly with respect to the miniaturized optical module. In the embodiment, an optical filter device which can easily install the wavelength variable interference filter 5 even to such an optical module will be described.

Figure 11:
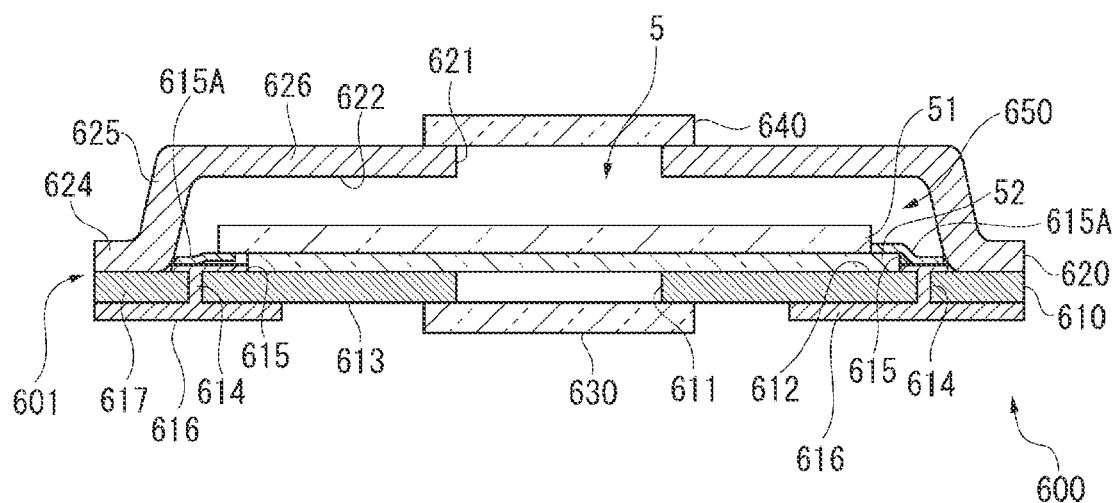
FIG. 11 is a cross-sectional view showing a schematic configuration of an optical filter device according to a second embodiment of the invention.

FIG. 11 is a cross-sectional view showing a schematic configuration of an optical filter device according to the second embodiment of the invention.

As shown in FIG. 11, an optical filter device 600 includes the wavelength variable interference filter 5 and a housing 601 which accommodates the wavelength variable interference filter 5.

The housing 601 includes a base substrate 610, a lid 620, a base side glass substrate 630, and a lid side glass substrate 640.

The base substrate 610 is configured with a single-layered ceramic substrate, for example. The movable substrate 52 of the wavelength variable interference filter 5 is installed on the base substrate 610. For the installation of the movable substrate 52 to the base substrate 610, the movable substrate may be disposed through an adhesive layer or the like, for example, or the movable substrate may be disposed by fitting the other fixing member or the like. In addition, a light transmission hole 611 is formed to be opened on the base substrate 610. The base side glass substrate 630 is joined so as to cover the light transmission hole 611. As the joining method of the base side glass substrate 630, for example, glass frit bonding using glass frit which is a fragment of glass obtained by dissolving a glass raw material at a high temperature and rapidly cooled, or adhesion performed by an epoxy resin can be used, for example.

An inner terminal portion 615 is provided corresponding to each of lead-out electrodes 563 and 564 of the wavelength variable interference filter 5, on a base inner surface 612 of the base substrate 610 corresponding to the lid 620. For the connection of each of the lead-out electrodes 563 and 564, and the inner terminal portion 615, FPC 615A can be used, for example, and they are joined to each other by Ag paste, anisotropic conductive film (ACF), anisotropic conductive paste (ACP), or the like. In addition, the connection is not limited to the connection performed by the FPC 615A, and wire connection performed by wire bonding or the like may be performed, for example.

In addition, in the base substrate 610, a penetrating hole 614 is formed corresponding to the position in which each inner terminal portion 615 is provided, and each inner terminal portion 615 is connected to an outer terminal portion 616 which is provided on a base outer surface 613 of the base substrate 610 on a side opposite to the base inner surface 612, through a conductive member which is filled in the penetrating hole 614.

A base joining portion 617 which is joined with the lid 620 is provided on the outer periphery portion of the base substrate 610.

As shown in FIG. 11, the lid 620 includes a lid joining portion 624 which is joined with the base joining portion 617 of the base substrate 610, a side wall portion 625 which is continued from the lid joining portion 624 and is risen in a direction separating from the base substrate 610, and a top surface portion 626 which is continued from the side wall portion 625 and covers the movable substrate 52 side of the wavelength variable interference filter 5. The lid 620 can be formed by alloy such as Kovar or metal.

This lid 620 is closely joined with the base substrate 610 by joining the lid joining portion 624 and the base joining portion 617 of the base substrate 610.

As the joining method, for example, in addition to the laser welding, soldering using silver solder, sealing using an eutectic alloy layer, welding using a low melting point glass, glass adhesion, glass frit bonding, adhesion using an epoxy resin, or the like is used. The joining method can be suitably selected depending on the material of the base substrate 610 and the lid 620 or a joining environment.

The top surface portion 626 of the lid 620 is set to be parallel with respect to the base substrate 610. A light penetrating hole 621 is formed to be opened on the top surface portion 626. The lid side glass substrate 640 is joined so as to cover the light penetrating hole 621. As a joining method of the lid side glass substrate 640, in the same manner as the joining of the base side glass substrate 630, the glass frit bonding or the adhesion by an epoxy resin can be used, for example.

In the optical filter device 600 of the embodiment described above, since the wavelength variable interference filter 5 is protected by the housing 601, it is possible to prevent damage on the wavelength variable interference filter 5 due to an external factor. In addition, since the inner portion of the optical filter device 600 is configured to be enclosed, it is possible to suppress invasion of a foreign material such as a water droplet or a charged material, and it is also possible to suppress a problem of attaching such a foreign material to the fixed reflection film 54 or the movable reflection film 55.

Other Embodiment

The invention is not limited to the embodiments described above, and modification, improvement, and the like in a range of achieving the object of the invention are included in the invention.

In the first embodiment, the etching of the groove 526 is performed by etching two times by the first and second etching steps, however, the second etching step may be repeated and the groove 526 may be formed by performing the etching step three or more times. That is, the side surface of the groove 526 may be configured with three or more curved surface portions.

In this case, the region of the side surface configuring the groove 526, in a plan view, can be further contracted.

In the first embodiment, the groove 526 is in a circular shape, and it is not limited thereto. For example, in the filter plan view, a configuration in which the plurality of arc-like grooves disposed at intervals of an equal angle are provided around the plan center point O, may be used.

In the first embodiment, the resist for electrophoretic deposition is used for the resist RE2, however, it is not limited thereto, in a case of preferably performing the fixation of the resist RE2.

In addition, in the first embodiment, the positive resist is used for the resist RE2, however, a negative resist may be used in a case of preferably performing light exposition.

In the embodiments, the configuration in which the dimension of the inter-reflection film gap G1 is changed due to the electrostatic actuator 56 which is configured by the fixed electrode 561 and the movable electrode 562, is used as an example, however it is not limited thereto.

For example, a dielectric actuator which is configured by a first dielectric coil provided on the fixed substrate 51 and a second dielectric coil provided on the movable substrate 52 or permanent magnet, may be used.

Further, a piezoelectric actuator may be used, instead of the electrostatic actuator 56. In this case, a lower electrode layer, a piezoelectric film, and an upper electrode layer are laminated to each other and disposed on the holding portion 522, for example, a voltage applied between the lower electrode layer and the upper electrode layer is variable as an input value, and accordingly a voltage film can be contracted to bend the holding portion 522.

Further, it is not limited to the configuration in which the size of the inter-reflection film gap G1 is changed by the voltage applying, and for example, a configuration of adjusting the size of the inter-reflection film gap G1 by changing air pressure between the fixed substrate 51 and the movable substrate 52, with respect to air pressure of the outside of the wavelength variable interference filter 5, can be used as an example.

In addition, in each embodiment described above, the spectrometry apparatus 1 is used as an example of the electronic apparatus according to the invention, however, in addition thereto, the wavelength variable interference filter 5, the optical module, and the electronic apparatus according to the invention can be applied in various fields.

Figure 12:
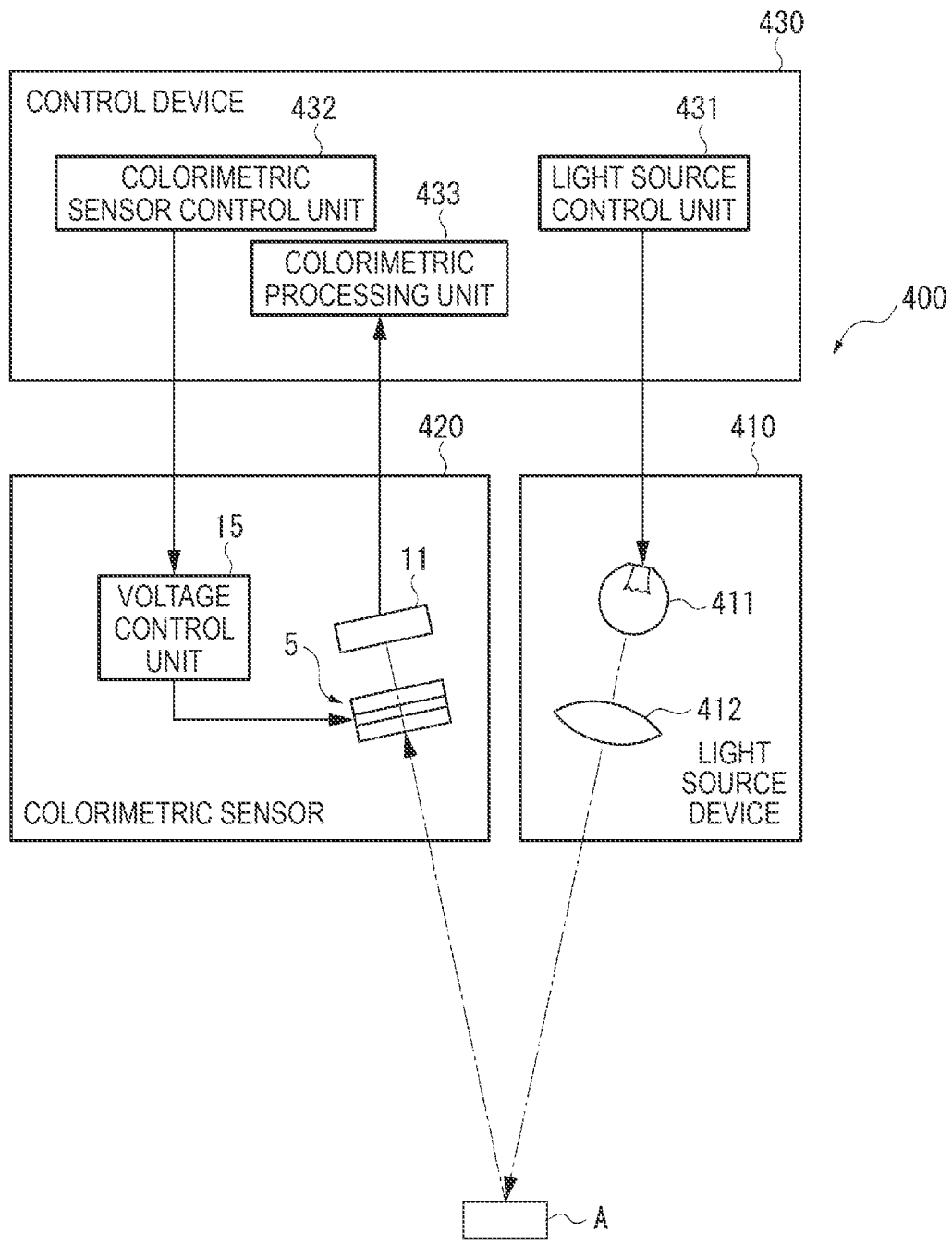
FIG. 12 is a block diagram showing one example of a colorimetry apparatus which is an electronic apparatus according to an embodiment of the invention.

For example, as shown in FIG. 12, the electronic apparatus according to the invention can be applied to a colorimetry apparatus for measuring a color.

FIG. 12 is a block diagram showing one example of a colorimetry apparatus 400 which includes the wavelength variable interference filter 5.

As shown in FIG. 12, the colorimetry apparatus 400 includes a light source device 410 which emits light to a investigation target A, a colorimetric sensor 420 (optical module), and a control device 430 (control unit) which controls the entire operation of the colorimetry apparatus 400. The colorimetry apparatus 400 is an apparatus which causes light incident from the light source device 410 to be reflected on the investigation target A, receives reflected investigation target light by the colorimetric sensor 420, and analyzes and measures chromaticity of the investigation target light, that is, a color of the investigation target A, based on a detection signal output from the colorimetric sensor 420.

The light source device 410 includes a light source 411 and a plurality of lenses 412 (only one is described in FIG. 12), and emits reference light (for example, white light), for example, with respect to the investigation target A. A collimater lens may be included in the plurality of lenses 412, and in this case, the light source device 410 sets the reference light emitted from the light source 411 as parallel light by the collimater lens, and emits the light towards the investigation target A from a projector lens (not shown). In the embodiment, the colorimetry apparatus 400 including the light source device 410 is used as an example, however, a configuration of not including the light source device 410 may be used, in a case where the investigation target A is a light emitting member such as a liquid crystal panel, for example.

As shown in FIG. 12, the colorimetric sensor 420 includes the wavelength variable interference filter 5, the detector 11 which receives light transmitting the wavelength variable interference filter 5, and the voltage control unit 15 which controls an applying voltage to the electrostatic actuator 56 of the wavelength variable interference filter 5. The optical filter device 600 may be used instead of the wavelength variable interference filter 5. The colorimetric sensor 420 includes an incident optical lens (not shown) which guides reflection light (investigation target light) reflected by the investigation target A to the inside, in a position corresponding to the wavelength variable interference filter 5. The colorimetric sensor 420 disperses light having a predetermined wavelength among the investigation target light emitted from the incident optical lens by the wavelength variable interference filter 5, and receives the dispersed light by the detector 11.

The control device 430 is the control unit according to the invention, and controls the entire operation of the colorimetry apparatus 400.

As the control device 430, for example, in addition to a general-purpose personal computer or a portable information terminal, a dedicated computer for colorimetry can be used. As shown in FIG. 12, the control device 430 includes alight source control unit 431, a colorimetric sensor control unit 432, and a colorimetric processing unit 433.

The light source control unit 431 is connected to the light source device 410, outputs a predetermined control signal to the light source device 410, based on the setting input of an operator, for example, and emits white light having predetermined brightness.

The colorimetric sensor control unit 432 is connected to the colorimetric sensor 420, sets a wavelength of light received by the colorimetric sensor 420, based on the setting input of an operator, for example, and outputs a command signal for indicating detection of received light intensity of the light having the wavelength to the colorimetric sensor 420. Accordingly, the voltage control unit 15 of the colorimetric sensor 420 applies a voltage to the electrostatic actuator 56, based on the control signal, and drives the wavelength variable interference filter 5.

The colorimetric processing unit 433 analyzes chromaticity of the investigation target A from the received light intensity detected by the detector 11. In the same manner as described above, the colorimetric processing unit 433 may analyze the chromaticity of the investigation target A by estimating an optical spectrum S using an estimation matrix Ms, with the light intensity obtained by the detector 11 as a measurement spectrum D.

In addition, as an example of the electronic apparatus according to the invention, a system of light base for detecting existence of a specified material is used. As such a system, for example, a car gas leakage detector which performs high sensitive detection of specified gas using a spectroscopic measurement method performed by using the wavelength variable interference filter 5, or a gas detection apparatus such as a photoacoustic rare gas detector for a breath test can be used as an example, for example.

One example of such a gas detection apparatus will be described with reference to the following drawings.

Figure 13:
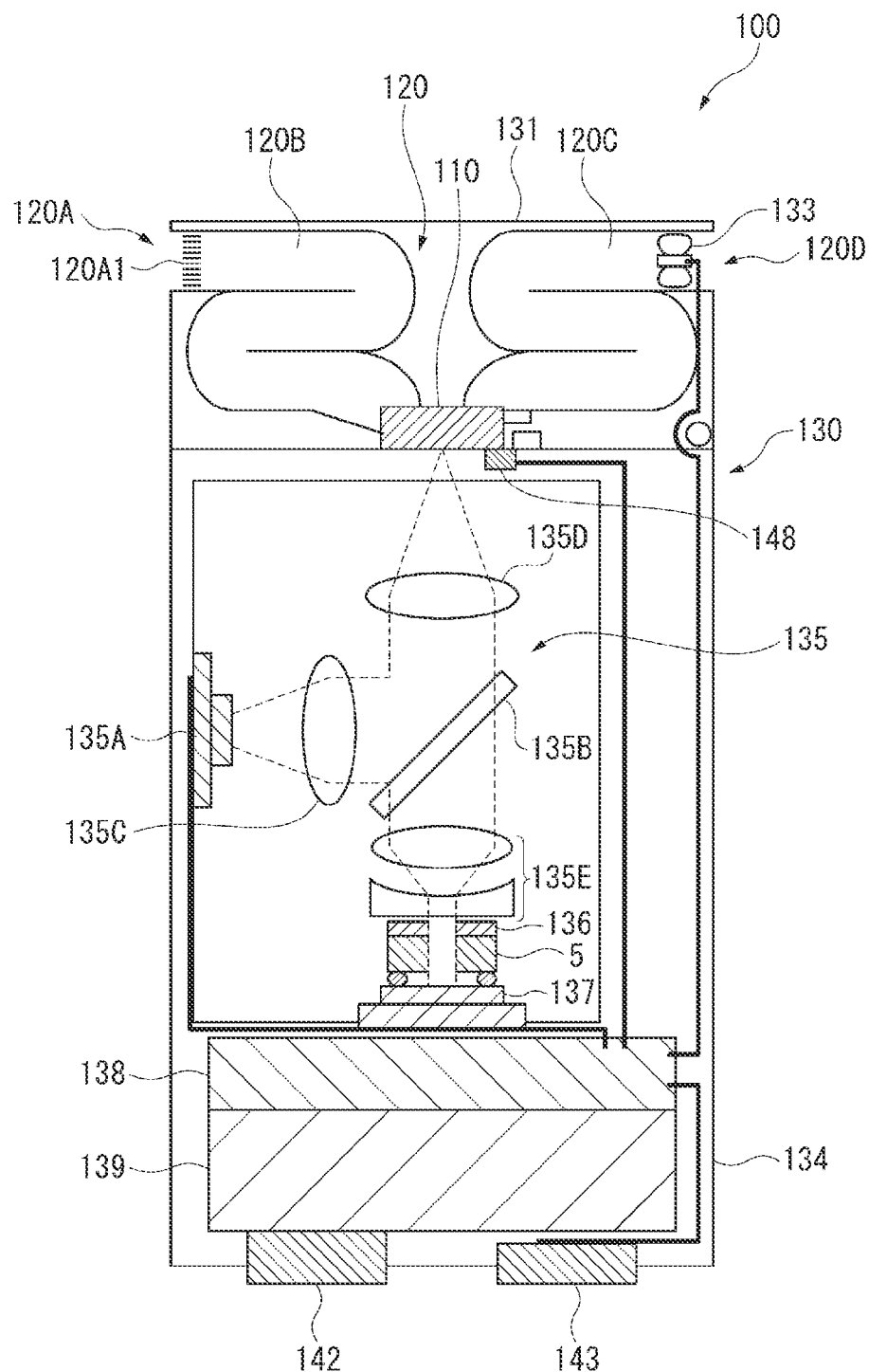
FIG. 13 is a schematic view showing one example of a gas detection apparatus which is an electronic apparatus according to an embodiment of the invention.

FIG. 13 is a schematic view showing one example of a gas detection apparatus which includes the wavelength variable interference filter 5.

Figure 14:
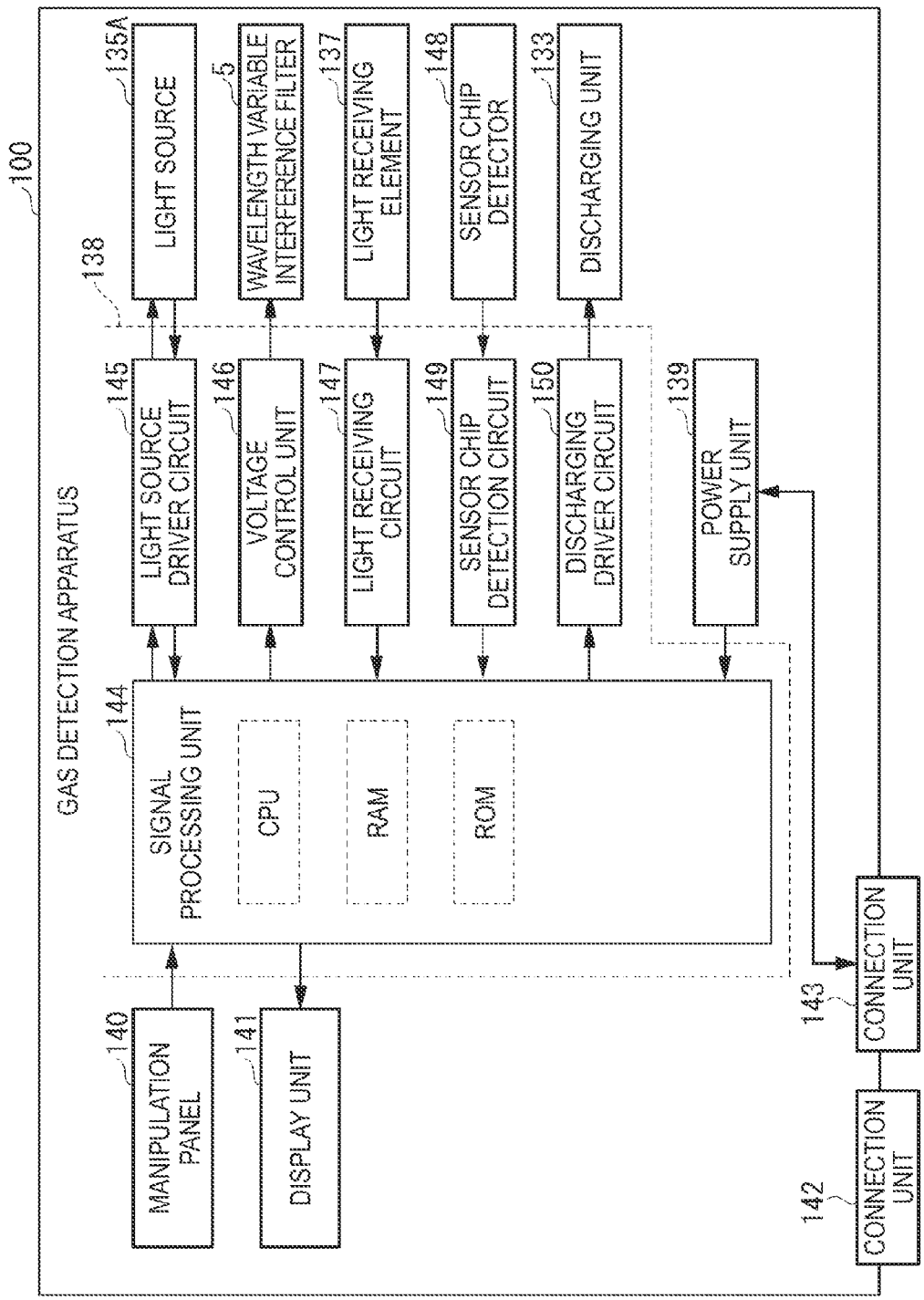
FIG. 14 is a block diagram showing a configuration of a control system of the gas detection apparatus of FIG. 13.

FIG. 14 is a block diagram showing a configuration of a control system of the gas detection apparatus of FIG. 13.

As shown in FIG. 13, a gas detection apparatus 100 includes a sensor chip 110, a flow path 120 which includes a suction port 120A, a suction flow path 120B, a discharging flow path 120C, and a discharging port 120D, and a main body portion 130.

The main body portion 130 is configured with a detection device which includes a sensor portion cover 131 including an opening for attaching or detaching the flow path 120, a discharging unit 133, a housing 134, an optical unit 135, a filter, 136, the wavelength variable interference filter 5, and a light receiving element 137 (detection unit), a control unit 138 which processes a detected signal and controls the detection unit, and a power supply unit 139 which supplies power. The optical filter device 600 may be used instead of the wavelength variable interference filter 5. The optical unit 135 is configured with a light source 135A which emits light, a beam splitter 135B which reflects light emitted from the light source 135A to the sensor chip 110 side and transmits the light emitted from the sensor chip side to the light receiving element 137 side, and lenses 135C, 135D, and 135E.

In addition, as shown in FIG. 14, a manipulation panel 140, a display unit 141, a connection unit 142 for an interface with the outside, and the power supply unit 139 are provided on the surface of the gas detection apparatus 100. A connection unit 143 for charging may be included, in a case where the power supply unit 139 is a secondary battery.

Further, as shown in FIG. 14, the control unit 138 of the gas detection apparatus 100 includes a signal processing unit 144 which is configured with a CPU or the like, a light source driver circuit 145 for controlling the light source 135A, a voltage control unit 146 for controlling the wavelength variable interference filter 5, a light receiving circuit 147 which receives a signal from the light receiving element 137, a sensor chip detection circuit 149 which reads a code of the sensor chip 110 and receives a signal from a sensor chip detector 148 which detects existence or non-existence of the sensor chip 110, and a discharging driver circuit 150 which controls the discharging unit 133. A memory unit (not shown) which stores the V-λ data is included in the gas detection apparatus 100.

Next, the operation of the gas detection apparatus 100 described above will be described hereinafter.

The sensor chip detector 148 is provided in the sensor portion cover 131 on the upper portion of the main body portion 130, and the existence or non-existence of the sensor chip 110 is detected by the sensor chip detector 148. If a detection signal from the sensor chip detector 148 is detected, the signal processing unit 144 determines that the sensor chip 110 is in a state of being mounted, and outputs a display signal for displaying a command for performing a detection operation to the display unit 141.

For example, if the manipulation panel 140 is manipulated by an operator, and an indication signal for starting a detection process is output from the manipulation panel 140 to the signal processing unit 144, first, the signal processing unit 144 outputs a signal of light source operation to the light source driver circuit 145 to operate the light source 135A. If the light source 135A is driven, stable laser light of linearly polarized light is emitted from the light source 135A with a single wavelength. In addition, a temperature sensor or a light intensity sensor is mounted in the light source 135A, and the information thereof is output to the signal processing unit 144. If it is determined that the light source 135A is stably operated, based on a temperature or light intensity input from the light source 135A, the signal processing unit 144 controls the discharging driver circuit 150 to operate the discharging unit 133. Accordingly, a gas sample including a target material to be detected (gas molecule) is induced from the suction port 120A to the suction flow path 120B, inside of the sensor chip 110, the discharging flow path 120C, and the discharging port 120D. A dust filter 120A1 is provided on the suction port 120A, and relatively large specks of dust or a some of vapor is removed.

In addition, the sensor chip 110 is a sensor in which a plurality of metallic nanostructures are embedded and localized surface plasmon resonance is used. In such a sensor chip 110, an enhanced electric field is formed between metallic nanostructures by laser light, and if a gas molecule is put into this enhanced electric field, Raman scattering light including information regarding molecule vibrating and Rayleigh scattering light are generated.

The Raman scattering light or the Rayleigh scattering light is incident to the filter 136 through the optical unit 135, the Rayleigh scattering light is separated by the filter 136, and the Raman scattering light is incident to the wavelength variable interference filter 5. The signal processing unit 144 outputs a control signal with respect to the voltage control unit 146. Accordingly, as shown in the embodiment, the voltage control unit 146 reads the voltage value corresponding to the measurement target wavelength from the memory unit, applies the voltage to the electrostatic actuator 56 of the wavelength variable interference filter 5, and disperses the Raman scattering light corresponding to the gas molecule which is the detection target by the wavelength variable interference filter 5. After that, if the dispersed light is received by the light receiving element 137, a light receiving signal according to the received light intensity is output to the signal processing unit 144 through the light receiving circuit 147. In this case, it is possible to precisely extract the Raman scattering light which is a target from the wavelength variable interference filter 5.

The signal processing unit 144 compares spectrum data of the Raman scattering light corresponding to the gas molecule which is the detection target obtained as described above and data stored in a ROM, determines whether or not it is the gas molecule of the target, and performs specification of material. In addition, the signal processing unit 144 displays the result information to the display unit 141 or outputs the result information to the outside from the connection unit 142.

In FIGS. 13 and 14, the gas detection apparatus 100 which disperses the Raman scattering light by the wavelength variable interference filter 5 to perform gas detection from the dispersed Raman scattering light is used as an example, however, as the gas detection apparatus, a gas detection apparatus which specifies gas types by detecting unique absorbency of the gas may be used. In this case, a gas sensor which makes the gas flow into the sensor and detects light absorbed by the gas among the incident light is used as the optical module according to the invention. A gas detection apparatus which analyzes and determines the gas flowing into the sensor by the gas sensor is used as the electronic apparatus according to the invention. Even with this configuration, it is possible to detect the component of the gas using the wavelength variable interference filter 5.

In addition, as a system for detecting the existence or non-existence of the specified material, not only limited to the detection of the gas, a material component analysis apparatus such as a noninvasive measurement apparatus of sugar by near-infrared spectrometry, or a noninvasive measurement apparatus of information such as food, a living body, or mineral can be used as an example.

Hereinafter, a food analysis apparatus will be described as one example of the material component analysis apparatus.

Figure 15:
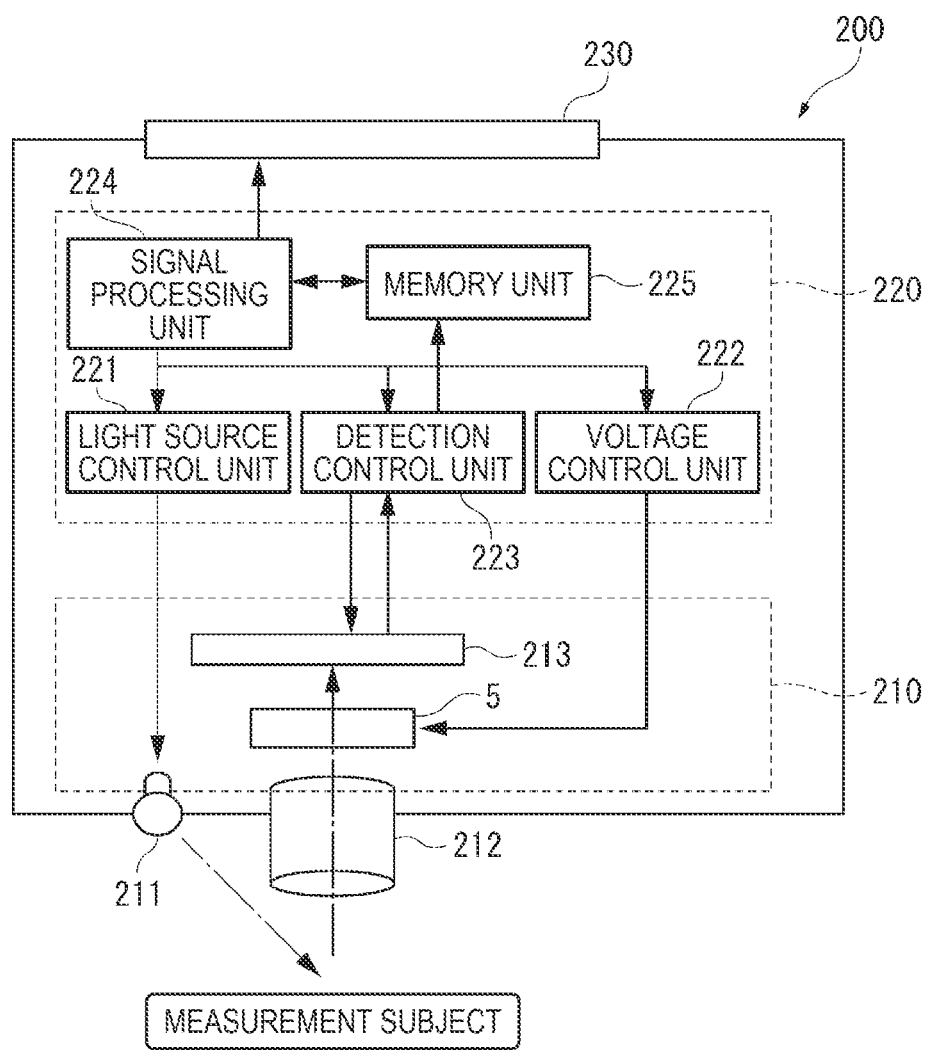
FIG. 15 is a diagram showing a schematic configuration of a food analysis apparatus which is an electronic apparatus according to an embodiment of the invention.

FIG. 15 is a diagram showing a schematic configuration of a food analysis apparatus which is one example of the electronic apparatus using the wavelength variable interference filter 5.

As shown in FIG. 15, the food analysis apparatus 200 includes a detector 210 (optical module), a control unit 220, and a display unit 230. The detector 210 includes a light source 211 which emits light, an imaging lens 212 which introduces light from a measurement subject, the wavelength variable interference filter 5 which disperses light introduced from the imaging lens 212, and an imaging unit 213 (detection unit) which detects the dispersed light. The optical filter device 600 may be used instead of the wavelength variable interference filter 5.

In addition, the control unit 220 includes a light source control unit 221 which performs lighting-on and lighting-off control of the light source 211 and brightness control at the time of turning on the light, a voltage control unit 222 which controls the wavelength variable interference filter 5, a detection control unit 223 which controls the imaging unit 213 and acquires a spectral image imaged by the imaging unit 213, a signal processing unit 224, and a memory unit 225.

In the food analysis apparatus 200, if the system is operated, the light source 211 is controlled by the light source control unit 221 and the light is emitted to the measurement subject from the light source 211. The light reflected by the measurement subject is incident to the wavelength variable interference filter 5 through the imaging lens 212. The wavelength variable interference filter 5 is driven by the control of the voltage control unit 222. Accordingly, it is possible to precisely extract light having a target wavelength from the wavelength variable interference filter 5. The extracted light is imaged by the imaging unit 213 configured with a CCD camera or the like, for example. The imaged light is stored in the memory unit 225 as a spectral image. The signal processing unit 224 controls the voltage control unit 222 to change a voltage value applied to the wavelength variable interference filter 5, and acquires the spectral image with respect to each wavelength.

The signal processing unit 224 performs arithmetic processing of data of each pixel of each image stored in the memory unit 225, and acquires a spectrum of each pixel. In addition, information related to the component of the food with respect to the spectrum is stored in the memory unit 225, for example, and the signal processing unit 224 analyzes the data of the acquired spectrum, based on the information related to the food stored in the memory unit 225, and acquires food components included in the detection target and the content thereof. It is possible to calculate the food calorie or freshness, from the acquired food components and the content thereof. In addition, by analyzing the spectrum distribution in the image, it is possible to perform extraction of the portion in which the freshness in the food of the investigation target is decreased, and it is also possible to perform detection of a foreign material included in the food.

The signal processing unit 224 performs a process of displaying information of the components or the content, the calorie, or the freshness of the food of the investigation target obtained by the described above actions, on the display unit 230.

In FIG. 15, the food analysis apparatus 200 is used as an example, however with substantially the same configuration, a noninvasive measurement apparatus can also be used for information other than the information described above. For example, a living body analysis apparatus which analyzes a living body component such as measurement or analysis of a body liquid component such as blood can be used. As such a living body analysis apparatus, if an apparatus which detects ethyl alcohol is used as an apparatus which measures a body liquid component such as blood, for example, an intoxicated driving prevention device which detects drinking conditions of a driver can be used. In addition, an electronic endoscope system including such a living body analysis apparatus can also be used.

A mineral analysis apparatus which performs component analysis of mineral can be used.

The wavelength variable interference filter, the optical module, and the electronic apparatus according to the invention can be applied to the following apparatus.

For example, by temporally changing the intensity of the light of each wavelength, it is possible to transmit the data by the light of each wavelength, and in this case, by dispersing the light of the specified wavelength by the wavelength variable interference filter 5 provided on the optical module and receiving the light by the light receiving unit, it is possible to extract the data transmitted by the light of the specified wavelength, and by processing the data of the light of each wavelength by the electronic apparatus including the optical module for data extraction, it is possible to perform optical communication.

The electronic apparatus can also be applied to a spectroscopic camera which images a spectral image by dispersing light by the wavelength variable interference filter according to the invention, or a spectrometer. As one example of the spectroscopic camera, an infrared camera in which the wavelength variable interference filter 5 is mounted is used.

Figure 16:
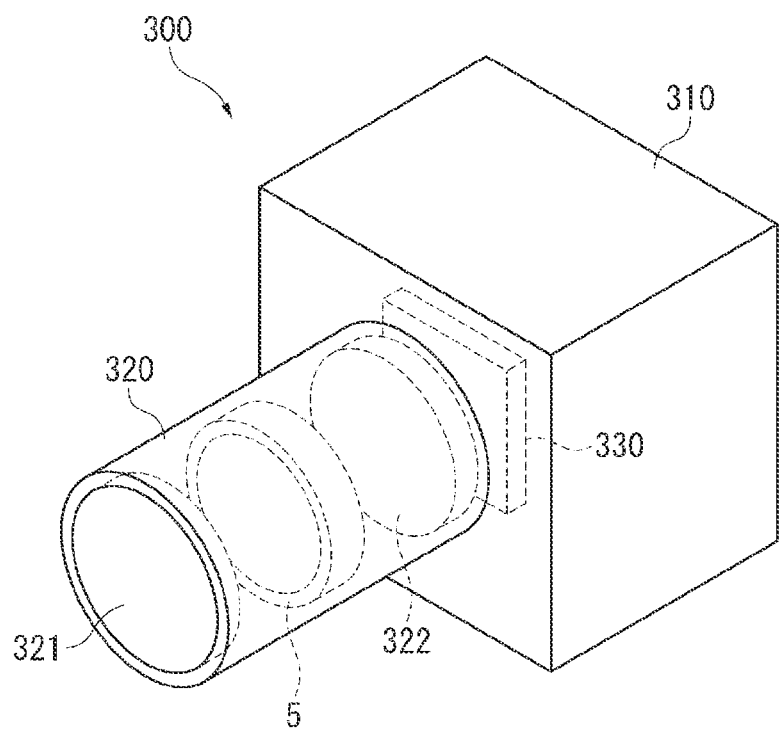
FIG. 16 is a schematic view showing a schematic configuration of a spectroscopic camera which is an electronic apparatus according to an embodiment of the invention.
Figure 17:
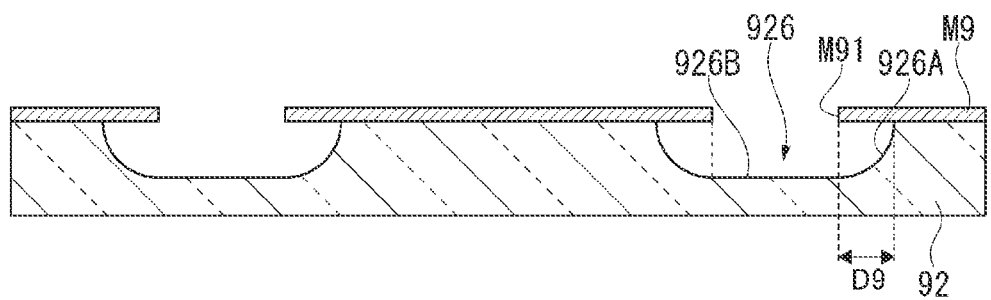
FIG. 17 is a diagram illustrating a problem of a wavelength variable interference filter of the related art.

FIG. 16 is a schematic view showing a schematic configuration of the spectroscopic camera. As shown in FIG. 16, a spectroscopic camera 300 includes a camera main body 310, an imaging lens unit 320, and an imaging unit 330 (detection unit).

The camera main body 310 is a portion which is grasped or manipulated by a user.

The imaging lens unit 320 is provided on the camera main body 310 and introduces an incident image light to the imaging unit 330. In addition, as shown in FIG. 16, the imaging lens unit 320 includes an objective lens 321, an imaging lens 322, and the wavelength variable interference filter 5 provided between the lenses.

The imaging unit 330 is configured with a light receiving element, and images the image light introduced by the imaging lens unit 320.

In such a spectroscopic camera 300, by transmitting the light of the wavelength which is an imaging target by the wavelength variable interference filter 5, it is possible to image the spectral image of the light having a predetermined wavelength.

In addition, the wavelength variable interference filter according to the invention may be used as a band pass filter, and for example, can be used as an optical laser apparatus which disperses and transmits only light in a narrow band around the predetermined wavelength by the wavelength variable interference filter 5, among the light of the predetermined wavelength band with the injection of the light emitting element, for example.

In addition, the wavelength variable interference filter according to the invention may be used as a biometric authentication apparatus, or can also be applied to an authentication apparatus of a blood vessel, fingerprint, retina, iris, or the like, using the light in a near-infrared region or a visible region.

Further, the optical module and the electronic apparatus can be used as a concentration detection apparatus. In this case, infrared energy (infrared light) emitted from the material is dispersed and analyzed by the wavelength variable interference filter 5 to measure subject concentration in the sample.

As described above, the wavelength variable interference filter, the optical module, and the electronic apparatus according to the invention can also be applied to any apparatus which disperses predetermined light from incident light. As described above, since the wavelength variable interference filter according to the invention can disperse the plurality of wavelengths with one device, it is possible to precisely perform measurement of the spectrum of the plurality of wavelengths and detection with respect to the plurality of components. Accordingly, compared to the apparatus of the related art which extracts the predetermined wavelength by the plurality of devices, it is possible to promote miniaturization of the optical module or the electronic apparatus, and for example, a portable or car optical device can be preferably used.

In addition thereto, for the specific structure when performing the invention, modifications can be suitably performed to other structure in a range of achieving the object of the invention.

The entire disclosure of Japanese Patent Application No. 2012-276552 filed on Dec. 19, 2012 is expressly incorporated by reference herein.

What is claimed is:

1. A wavelength variable interference filter comprising:
a first substrate;
a second substrate which is disposed to oppose the first substrate;
a first reflection film which is provided on the first substrate; and
a second reflection film which is provided on the second substrate and opposes the first reflection film,
wherein the second substrate includes a movable portion and a groove provided outside of the movable portion in a plan view,
the groove has a bottom surface, a first side surface which is continued to the bottom surface, and a second side surface which is continued to the bottom surface,
the first side surface has a first arc-like curved surface portion and a second arc-like curved surface portion in a cross-sectional view, and
the second side surface has a third arc-like curved surface portion and a fourth arc-like curved surface portion in the cross-sectional view.

2. An optical filter device comprising:
a wavelength variable interference filter which includes a first substrate, a second substrate which is disposed to oppose the first substrate, a first reflection film which is provided on the first substrate and reflects a portion of incident light and transmits another portion of the incident light, and a second reflection film which is provided on the second substrate, opposes the first reflection film, and reflects a portion of incident light and transmits another portion of the incident light; and
a housing which accommodates the wavelength variable interference filter,
wherein the second substrate includes a movable portion and a groove provided outside of the movable portion in a plan view,
the groove includes a bottom surface, a first side surface which is continued to the bottom surface, and a second side surface which is continued to the bottom surface,
the first side surface has a first arc-like curved surface portion and a second arc-like curved surface portion in a cross-sectional view, and
the second side surface has a third arc-like curved surface portion and a fourth arc-like curved surface portion in the cross-sectional view.

3. The wavelength variable interference filter according to claim 1,
wherein the first, second, third, and fourth arc-like curved surface portions are portions of a first virtual circle, a second virtual circle, a third virtual circle, and a fourth virtual circle, respectively, and centers of the first and second virtual circles are positioned on a first virtual linear line that extends orthogonal to the bottom surface from a boundary of the bottom surface and the first side surface, and centers of the third and fourth virtual circles are positioned on a second virtual linear line that extends orthogonal to the bottom surface from a boundary of the bottom surface and the second side surface.

4. An optical module comprising the wavelength variable interference filter according to claim 1.

5. An electronic apparatus comprising the wavelength variable interference filter according to claim 1.

* * * * *